(12) United States Patent
Kubo et al.

(10) Patent No.: US 10,746,097 B2
(45) Date of Patent: Aug. 18, 2020

(54) COMPRESSED AIR ENERGY STORAGE POWER GENERATION DEVICE AND COMPRESSED AIR ENERGY STORAGE POWER GENERATION METHOD

(71) Applicant: Kobe Steel, Ltd., Hyogo (JP)

(72) Inventors: Yohei Kubo, Kobe (JP); Masatake Toshima, Kobe (JP); Makoto Nishimura, Kobe (JP); Masaki Matsukuma, Hyogo (JP); Hiroki Saruta, Takasago (JP); Kanami Sakamoto, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 686 days.

(21) Appl. No.: 15/537,587

(22) PCT Filed: Dec. 14, 2015

(86) PCT No.: PCT/JP2015/084937
§ 371 (c)(1),
(2) Date: Jun. 19, 2017

(87) PCT Pub. No.: WO2016/104222
PCT Pub. Date: Jun. 30, 2016

(65) Prior Publication Data
US 2018/0266315 A1    Sep. 20, 2018

(30) Foreign Application Priority Data

Dec. 25, 2014  (JP) .................................. 2014-263007
Sep. 10, 2015  (JP) .................................. 2015-178384

(51) Int. Cl.
*F02C 1/05*    (2006.01)
*F02C 6/16*    (2006.01)
(Continued)

(52) U.S. Cl.
CPC ................ *F02C 1/05* (2013.01); *F02C 6/16* (2013.01); *F03D 9/17* (2016.05); *F28D 20/00* (2013.01);
(Continued)

(58) Field of Classification Search
CPC ...... F03D 9/17; F02C 6/16; F28D 2021/0047; Y02E 60/15
(Continued)

(56) References Cited

U.S. PATENT DOCUMENTS 3,677,008 A * 7/1972 Koutz ...................... F02C 6/16
                                                                60/650
3,895,492 A * 7/1975 Forster ..................... F02C 1/10
                                                                60/659
(Continued)

FOREIGN PATENT DOCUMENTS

JP    H07-42573 A    2/1995
JP    2013-509530 A    3/2013
(Continued)

OTHER PUBLICATIONS

International Search Report issued in PCT/JP2015/084937; dated Mar. 15, 2016.
(Continued)

*Primary Examiner* — Mark A Laurenzi
*Assistant Examiner* — Mickey H France
(74) *Attorney, Agent, or Firm* — Studebaker & Brackett PC

(57) ABSTRACT

A compressed air energy storage power generation device includes a first heat exchanger, a heat storage tank, a second heat exchanger, a heating unit, a first power distributor, and a controller. The first heat exchanger performs heat exchange between the compressed air from a compressor and the heating medium. The heat storage tank stores the (Continued)

heating medium heatexchanged by the first heat exchanger. The second heat exchanger performs heat exchange between the compressed air from an accumulator tank and the heating medium from the heat storage tank. The first power distributor distributes the generated power of the power generator to a power system and the heating unit. When the internal pressure of the accumulator tank reaches a predetermined pressure and the generated power is larger than the power demand, the controller supplies a part or all of the generated power to the heating unit by the first power distributor.

13 Claims, 12 Drawing Sheets

(51) Int. Cl.
    *F28F 27/00* (2006.01)
    *F28D 20/00* (2006.01)
    *F03D 9/17* (2016.01)
    *F28F 27/02* (2006.01)
    *H02P 9/08* (2006.01)

(52) U.S. Cl.
    CPC ........ *F28D 20/0034* (2013.01); *F28F 27/00* (2013.01); *F28F 27/02* (2013.01); *H02P 9/08* (2013.01); *F05D 2220/60* (2013.01); *F05D 2220/76* (2013.01); *F05D 2260/213* (2013.01); *F05D 2270/053* (2013.01); *F05D 2270/301* (2013.01); *F05D 2270/335* (2013.01); *F28D 2020/0082* (2013.01); *Y02E 60/142* (2013.01); *Y02E 60/15* (2013.01)

(58) Field of Classification Search
    USPC .......................................................... 60/659
    See application file for complete search history.

(56) References Cited

U.S. PATENT DOCUMENTS

| | | | | |
|---|---|---|---|---|
| 4,150,547 A * | 4/1979 | Hobson | F02C 6/16 | 165/45 |
| 4,158,145 A * | 6/1979 | Kartsounes | F02C 3/28 | 290/52 |
| 4,283,914 A * | 8/1981 | Allen | F03G 6/06 | 60/641.14 |
| 4,523,432 A * | 6/1985 | Frutschi | E21B 43/00 | 60/646 |
| 4,630,436 A * | 12/1986 | Frutschi | F02C 3/205 | 60/39.183 |
| 4,873,828 A * | 10/1989 | Laing | F03D 1/02 | 60/659 |
| 4,942,736 A * | 7/1990 | Bronicki | F02C 1/05 | 60/641.12 |
| 5,363,642 A * | 11/1994 | Frutschi | F02C 6/16 | 60/774 |
| 5,379,589 A * | 1/1995 | Cohn | F01B 17/00 | 60/39.59 |
| 5,491,969 A * | 2/1996 | Cohn | F01B 17/00 | 60/775 |
| 5,495,709 A * | 3/1996 | Frutschi | F01K 21/047 | 60/39.55 |
| 5,537,822 A * | 7/1996 | Shnaid | F02C 6/04 | 60/650 |
| 5,634,340 A * | 6/1997 | Grennan | F02C 1/02 | 60/648 |
| 7,500,349 B2 * | 3/2009 | Althaus | F01D 25/305 | 60/39.511 |
| 8,341,964 B2 * | 1/2013 | Finkenrath | H02J 15/006 | 60/772 |
| 9,523,285 B2 * | 12/2016 | Heiligenstein | F01D 15/10 | |
| 9,890,712 B2 * | 2/2018 | Morgan | F02C 1/04 | |
| 10,344,628 B2 * | 7/2019 | Kubo | H02J 15/00 | |
| 10,480,410 B2 * | 11/2019 | Matsukuma | F02C 1/05 | |
| 2004/0148922 A1 * | 8/2004 | Pinkerton | F02C 7/08 | 60/39.6 |
| 2005/0178114 A1 * | 8/2005 | Althaus | F02C 6/16 | 60/407 |
| 2007/0255459 A1 * | 11/2007 | Althaus | F02C 6/16 | 700/290 |
| 2011/0094231 A1 * | 4/2011 | Freund | F02C 6/16 | 60/727 |
| 2011/0100010 A1 * | 5/2011 | Freund | F02C 1/005 | 60/659 |
| 2011/0100213 A1 * | 5/2011 | Finkenrath | F02C 1/02 | 95/92 |
| 2013/0001948 A1 * | 1/2013 | Lim | F02C 6/16 | 290/52 |
| 2013/0061591 A1 * | 3/2013 | Bove | F02C 6/16 | 60/645 |
| 2013/0240068 A1 * | 9/2013 | Samara-Rubio | F15B 11/0725 | 137/571 |
| 2015/0000248 A1 * | 1/2015 | del Omo | F01K 23/10 | 60/39.182 |
| 2020/0088095 A1 * | 3/2020 | Kubo | F02C 6/16 | |

FOREIGN PATENT DOCUMENTS

| | | |
|---|---|---|
| JP | 2013-509532 A | 3/2013 |
| JP | 2013-064399 A | 4/2013 |
| WO | WO-2010125568 A2 * 11/2010 | ............. F03D 9/28 |

OTHER PUBLICATIONS

Notification of Transmittal of Translation of the International Preliminary Report on Patentability and Translation of Written Opinion of the International Searching Authority issued in PCT/JP2015/084937; dated Jul. 6, 2017.

\* cited by examiner

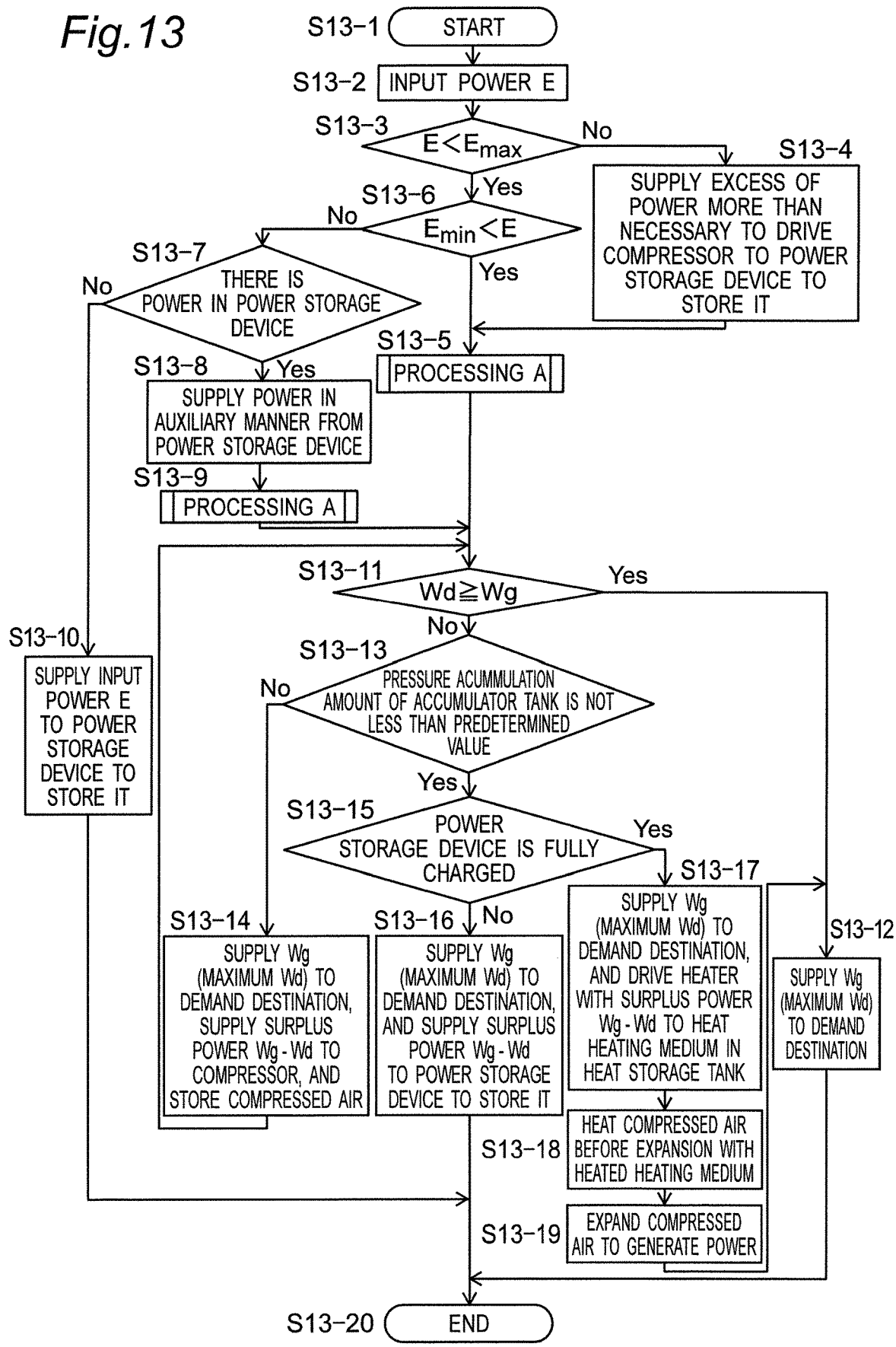

ant_air; an accumulator tank fluidly connected to the compressor and configured to store compressed air compressed by the compressor; a pressure sensor configured to detect internal pressure of the accumulator tank; an expander fluidly connected to the accumulator tank, the expander driven with the compressed air; a power generator mechanically connected to the expander and configured to generate power; a first heat exchanger fluidly connected to the compressor and configured to exchange heat between the compressed air supplied from the compressor and a heating medium; a heat storage tank fluidly connected to the first heat exchanger and configured to store the heating medium heat-exchanged by the first heat exchanger; a second heat exchanger fluidly connected to the accumulator tank and the heat storage tank, the second heat exchanger configured to exchange heat between the compressed air supplied from the accumulator tank and the heating medium supplied from the heat storage tank; a heating unit configured to heat the heating medium in the heat storage tank by using power generated by the power generator; a first power distributor configured to distribute generated power of the power generator to at least a power system and the heating unit; and a controller configured to control the first power distributor to supply a part or all of the generated power of the power generator to the heating unit when the internal pressure of the accumulator tank reaches a predetermined value and the generated power of the power generator is larger than a power demand in the power system.

COMPRESSED AIR ENERGY STORAGE POWER GENERATION DEVICE AND COMPRESSED AIR ENERGY STORAGE POWER GENERATION METHOD

CROSS-REFERENCE TO RELATED APPLICATIONS

This is a national phase application in the United States of International patent application No. PCT/JP2015/084937 with an international filing date of Dec. 14, 2015, which claims priority of Japanese patent Applications No. 2014-263007 filed on Dec. 25, 2014 and No. 2015-178384 filed on Sep. 10, 2015 the contents of which are incorporated herein by reference.

TECHNICAL FIELD

The present invention relates to a compressed air energy storage power generation device and a compressed air energy storage power generation method.

BACKGROUND ART

Since power generation using renewable energy such as wind power generation and solar power generation depends on weather conditions, the output may not be stable. For this reason, it is necessary to level the output by using an energy storage system such as a compressed air energy storage (CAES) system.

It is common that the conventional compressed air energy storage (CAES) power generation device stores electric energy as compressed air in the accumulator tank during the off-peak time of the power plant, and drives the expander with the compressed air to operate the generator to generate electrical energy during the high power demand time.

In addition, in order to improve power generation efficiency, there is one that performs heat recovery on the compression heat of the compressed air to store heat in the heat storage tank or the like to return heat to the compressed air before expansion, whereby prevents heat energy loss by dissipating heat in the accumulator tank.

As this CAES power generation device, for example, JP 2013-509530 a discloses a CAES power generation device using a heat energy storage system.

However, if manufactured in a size corresponding to the accumulation amount at the time of the peak of the high power demand, the accumulator tank that stores compressed air needs to be large size. Therefore, much equipment cost is needed.

SUMMARY OF THE INVENTION

Problems to be Solved by the Invention

An object of the present invention is to provide a compressed air energy storage power generation device capable of improving power generation efficiency and reducing equipment cost.

Means for Solving the Problems

A first aspect of the present invention provides a compressed air energy storage power generation device comprising: an electric motor driven with input power generated by using renewable energy; a compressor mechanically connected to the electric motor and configured to compress According to this configuration, using surplus power for the heat storage allows the waste of power to be suppressed to improve the power generation efficiency, and reducing the capacity of the accumulator tank in size allows the equipment cost to be reduced. The surplus power means the difference power between the generated power by the power generator and the power demand. Usually, when the accumulator tank cannot accumulate any more, the surplus power will be discarded. However, since heating the heating medium in the heat storage tank by the heating unit causes the heated heating medium to heat the compressed air before expansion in the second heat exchanger, the expander can be driven with the heated compressed air to improve the expansion efficiency. In addition, the capacity of the accumulator tank of the whole device (the sum of the capacity when there are a plurality of accumulator tanks) needs to be set depending on the peak of the power demand. However, since surplus power can be used for the heat storage with this configuration, waste of power can be suppressed, and even when an accumulation amount of the accumulator tank exceeds the predetermined capacity and cannot accumulate any more, energy can be stored in another form of heat. Therefore, the capacity of the accumulator tank does not need to be set depending on the peak of the power demand, and the capacity of the accumulator tank can be reduced.

It is preferable that the compressed air energy storage power generation device further includes a second power distributor configured to distribute the input power to the electric motor and the heating unit, and when operation efficiency of the compressor is not more than a predetermined value, the controller controls the second power distributor to supply the input power to the heating unit.

Even when the operation efficiency of the compressor is not more than the predetermined value, input power can be used for heat storage, and therefore input power can be used efficiently. The case where the operation efficiency is not more than the predetermined value occurs when the input power is smaller than the predetermined value or larger than the predetermined value. The input power that is too small to drive a compressor and the input power that is too large to drive a compressor, leading to operation efficiency of not more than a predetermined value, cannot usually be used and will be discarded. However, in this configuration, such small input power and large input power can also be used for heat storage with the supply of the input power to the heating unit.

It is preferable that the compressed air energy storage power generation device further includes: a power storage device electrically connected to the power generator, the power storage device configured to store the generated power of the power generator, and a temperature sensor configured to detect a temperature of a heating medium in the heat storage tank; the first power distributor distributes power of the power generator to the power system, the heating unit, and the power storage device; and the controller controls the first power distributor to supply a part or all of the power generated by the power generator to the power storage device when the internal pressure of the accumulator tank reaches a predetermined pressure, the power generated by the power generator is larger than the power demand in the power system, and the temperature of the heating medium in the heat storage tank measured by the temperature sensor is not less than a predetermined temperature.

Providing the power storage device in addition to the heating unit allows the surplus power to be stored. In particular, even when the temperature of the heating medium in the heat storage tank is a predetermined temperature or more, and the temperature of the heating medium cannot be raised with the heating unit, energy can be effectively stored as electric energy. In particular, when the fluctuation of the power generation amount due to the renewable energy (the difference between the peak time and the normal time) is large, if devices to make effective use of surplus power are not made, an accumulator tank of enormous size or a large number of accumulator tanks are necessary. Since the cost of the accumulator tank in the total cost is large, even when a power storage device is newly installed, the cost can be greatly reduced as a whole by reducing the capacity of the accumulator tank.

In addition, the present invention provides a compressed air energy storage power generation device comprising: an electric motor driven with input power generated by using renewable energy; a compressor mechanically connected to the electric motor and configured to compress air; an accumulator tank fluidly connected to the compressor and configured to store compressed air compressed by the compressor; a pressure sensor configured to detect internal pressure of the accumulator tank; an expander fluidly connected to the accumulator tank and driven with the compressed air; a power generator mechanically connected to the expander and configured to generate power; a first heat exchanger fluidly connected to the compressor and configured to exchange heat between the compressed air supplied from the compressor and a heating medium; a heat storage tank fluidly connected to the first heat exchanger and configured to store the heating medium heat-exchanged by the first heat exchanger; a second heat exchanger fluidly connected to the accumulator tank and the heat storage tank, the second heat exchanger configured to exchange heat between the compressed air supplied from the accumulator tank and the heating medium supplied from the heat storage tank; a power storage device electrically connected to the power generator and configured to store the generated power of the power generator; a first power distributor configured to distribute the generated power of the power generator to at least a power system and the power storage device; and a controller configured to control the first power distributor to supply a part or all of the generated power of the power generator to the power storage device when the internal pressure of the accumulator tank reaches a predetermined pressure and the generated power of the power generator is larger than a power demand in the power system.

According to this configuration, using surplus power for the power storage allows the waste of power to be suppressed to improve the power generation efficiency, and reducing the capacity of the accumulator tank in size allows the equipment cost to be reduced.

It is preferable that the compressed air energy storage power generation device further includes a second power distributor configured to distribute the input power to the electric motor and the power storage device, and when operation efficiency of the compressor is not more than a predetermined value, the controller controls the second power distributor to supply the input power to the power storage device.

The input power so small or the input power so large that the operation efficiency of the compressor is not more than the predetermined value can also be effectively used by being stored.

It is preferable that when input power supplied to the electric motor is not more than a predetermined value, the controller supplies power from the power storage device to the electric motor.

Even when the input power supplied to the electric motor is the predetermined value or less, supplying power in an auxiliary manner from the power storage device to the electric motor causes the power of the predetermined value or more to be supplied to the electric motor, and a decrease in operation efficiency can be prevented.

It is preferable that the compressed air energy storage power generation device further includes a heating unit configured to heat the heating medium in the heat storage tank by using power generated by the power generator; the first power distributor distributes power of the power generator to the power system, the power storage device, and the heating unit; and the controller controls the first power distributor to supply a part or all of the power generated by the power generator to the heating unit when the internal pressure of the accumulator tank reaches a predetermined pressure, the power generated by the power generator is larger than the power demand in the power system, and the power storage device is already fully charged.

Providing the heating unit in addition to the power storage device allows the surplus power to be used for heat storage. In particular, even when the power storage device is fully charged and the power cannot be stored any further, energy can be effectively stored as heat energy.

It is preferable that the heating medium includes a first heating medium and a second heating medium separated from each other; the heat storage tank includes a first heat storage tank configured to store the first heating medium and a second heat storage tank configured to store the second heating medium; the first heat storage tank is fluidly connected to the first heat exchanger and the second heat exchanger; the second heating medium stored in the second heating storage tank is heated by the heating unit; and a third heat exchanger fluidly connected to the accumulator tank and the second heat storage tank, the third heat exchanger configured to exchange heat between the compressed air supplied from the accumulator tank and the second heating medium supplied from the second heat storage tank is further included.

According to this configuration, since the first heating medium for recovering the compression heat and the second heating medium heated by the heating unit can be separated, the power generation efficiency can be further improved. Heating with the compression heat or the heating unit has different heating temperatures. Therefore, separating the two heating mediums from each other allows the heat storage at different temperatures. For this reason, the power generation efficiency can be further improved.

It is preferable that the compressed air energy storage power generation device further includes: a first temperature sensor configured to detect a temperature of the first heat storage tank, a second temperature sensor configured to detect a temperature of the second heat storage tank, and a heat exchange sequence switcher configured to switch which of the second heat exchanger and the third heat exchanger acts first on the compressed air supplied from the accumulator tank; and the controller controls the heat exchange sequence switcher to cause the second heat exchanger to act first when a detected temperature of the second temperature sensor is higher than a detected temperature of the first temperature sensor, and to cause the first heat exchanger to act first when a detected temperature of the first temperature sensor is higher than a detected temperature of the second temperature sensor.

According to this configuration, since the compressed air before expansion can be heated to a higher temperature, the power generation efficiency can be improved. For the compressed air before expansion, as the heat exchange sequence, the heating medium having the higher temperature out of the first heating medium and the second heating medium is heat-exchanged later. Therefore, the temperature of the compressed air heated with the heating medium having a higher temperature is not lowered. For this reason, the power generation efficiency can be further improved.

It is preferable that the accumulator tank has a capacity smaller than a capacity needed for a peak of the power demand.

According to this configuration, equipment cost can be reduced by the reduction in the capacity of the accumulator tank. That is, it is not needed to prepare large capacity or large number of accumulator tanks for adapting the size or number of accumulator tanks to the peak of the power demand. In addition, using a tank with a small capacity allows the time it takes to pressurize until the pressure becomes suitable for power generation to be shortened. Therefore, it is easy to always maintain high pressure. Therefore, responsiveness to fluctuations in power demand can be improved.

A second aspect of the present invention provides a method for compressed air energy storage power generation comprising: compressing air with input power generated by using renewable energy; storing compressed air; generating power by expanding stored compressed air; recovering compression heat generated in the step of compressing; storing recovered compression heat; heating compressed air to be expanded with stored compression heat before the step of expanding; and further raising a temperature of the heat storage with a part or all of the generated power when a pressure of the stored compressed air reaches a predetermined value, and the generated power is larger than a power demand.

In addition, the present invention provides a method for compressed air energy storage power generation comprising: compressing air with input power generated by using renewable energy; storing compressed air; generating power by expanding stored compressed air; recovering compression heat generated in the step of compressing; storing recovered compression heat; heating compressed air to be expanded with stored compression heat before the step of expanding; and storing a part or all of the generated power when a pressure of the stored compressed air reaches a predetermined value, and the generated power is larger than a power demand.

Effect of the Invention

According to the present invention, power generation efficiency can be improved and equipment cost can be reduced in a compressed air energy storage power generation device by using surplus power for heat storage.

BRIEF DESCRIPTION OF THE DRAWINGS

FIG. 13 is a flowchart showing a second control method of the compressed air energy storage power generation device in FIG. 11.

DESCRIPTION OF EMBODIMENTS

In the following, the embodiments of the present invention will be described with reference to the accompanying drawings.

First Embodiment

Figure 1:
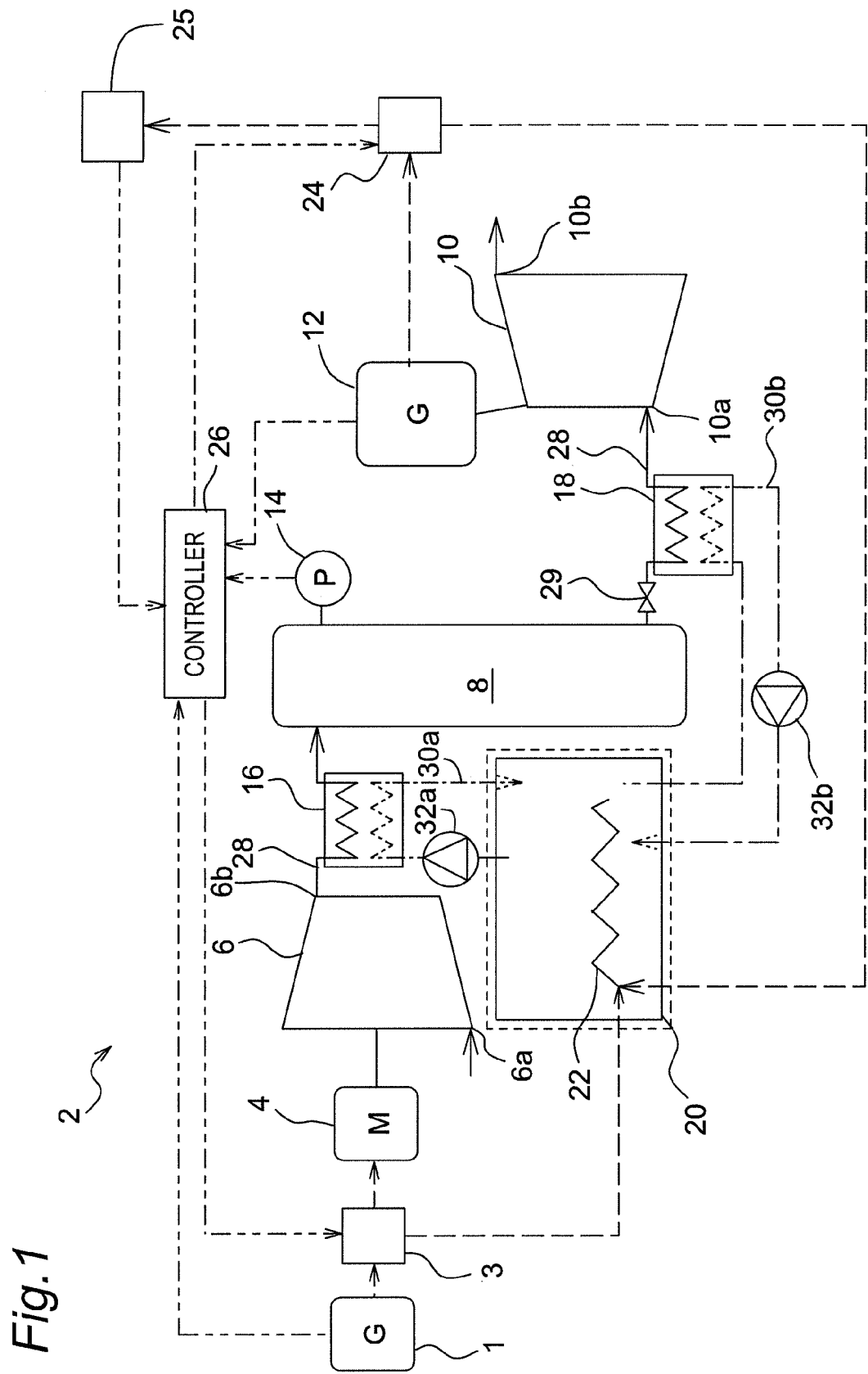
FIG. 1 is a schematic configuration diagram of a compressed air energy storage (CAES) power generation device of a first embodiment.

FIG. 1 shows a schematic configuration diagram of a compressed air energy storage (CAES) power generation device 2 according to a first embodiment of the present invention. The CAES power generation device 2 levels the output fluctuation to a power system 25 when generating power by using renewable energy, and outputs power depending on the fluctuation of the power demand in the power system 25.

With reference to FIG. 1, the configuration of the CAES power generation device 2 will be described.

The CAES power generation device 2 levels the output fluctuation of a power generation device 1 that uses renewable energy. The CAES power generation device 2 includes a second power distributor 3, a motor (electric motor) 4, a compressor 6, an accumulator tank 8, an expander 10, a power generator 12, a pressure sensor 14, a first heat exchanger 16, a second heat exchanger 18, a heat storage tank 20, a heater (heating unit) 22, a first power distributor 24, and a controller 26.

The input power generated by the power generation device 1 using the renewable energy is supplied to the motor 4 through the second power distributor 3. The motor 4 is driven with this power. The motor 4 is mechanically connected to the compressor 6.

The input power from the power generation device 1 can also be supplied to the heater 22 through the second power distributor 3. The input power is supplied to the motor 4 at the ordinary time, but the second power distributor 3 is switched depending on the magnitude of the input power as described below, and the input power is supplied to the heater 22. Therefore, the second power distributor 3 of the present embodiment is electrically connected to the power generation device 1, the motor 4, and the heater 22 (see the broken line in FIG. 1).

The compressor 6 operates by driving of the motor 4. A discharge port 6b of the compressor 6 is fluidly connected to the accumulator tank 8 through the first heat exchanger 16. When driven by the motor 4, the compressor 6 sucks air from a suction port 6a, compresses the air to discharge the compressed air from the discharge port 6b, and pumps it to the accumulator tank 8. In the motor 4 of the compressor 6, the number of revolutions is controlled by an inverter (not shown), and the stability of the operational state can be checked by checking the number of revolutions through the inverter.

The accumulator tank 8 includes a pressure sensor 14 for detecting the pressure of the compressed air stored inside. The accumulator tank 8 is fluidly connected to the expander 10 through the second heat exchanger 18. The accumulator tank 8 stores pumped compressed air. The accumulator tank 8 uses that with a small capacity for the necessary power demand peak. Equipment cost can be reduced by the reduction in the capacity of the accumulator tank 8. In addition, using the accumulator tank 8 with a small capacity allows the time it takes to pressurize until the pressure becomes suitable for power generation to be shortened. Therefore, it is easy to always maintain high pressure. Therefore, responsiveness to fluctuations in a power demand can be improved. Thus, energy can be accumulated in the accumulator tank 8 as compressed air. The compressed air stored in the accumulator tank 8 is supplied to the expander 10.

The fluid connection between the compressor 6, the first heat exchanger 16, the accumulator tank 8, the second heat exchanger 18, and the expander 10 is made through an air supply passage 28. A valve 29 is provided in the air supply passage 28 from the accumulator tank 8 to the expander 10, and can allow or cut off the supply of compressed air to the expander 10.

The expander 10 is mechanically connected to the power generator 12. The expander 10 supplied with compressed air from a supply port 10a operates with the supplied compressed air to drive the power generator 12. The expanded air is discharged from an exhaust port 10b.

The power generator 12 is electrically connected to the first power distributor 24. The power generated by the power generator 12 driven by the expander 10 is supplied to the first power distributor 24.

The first power distributor 24 is electrically connected to the power generator 12, the external power system 25, and the heater 22 (see the broken line in FIG. 1). The first power distributor 24 distributes the power supplied from the power generator 12 to the external power system 25 and the heater 22. For example, the distribution may supply half of the power supplied from the power generator 12 to the external power system 25 and the remaining half to the heater 22. In addition, all of the power supplied from the power generator 12 can be supplied to the heater 22 or the power system 25.

Each of the input power generated by the power generation device 1 and the power demand from the external power system 25 can be measured as the power demand supply balance in the power network as in the smart grid, and these measured values are output to the controller 26 described below. Alternatively, the input power may be estimated based on the past weather data, and the power demand may be estimated based on the past demand data. In addition, in particular, the input power may be estimated based on the current weather data. For example, in the case of wind power generation, the wind force or the like in a place slightly away on the windward side of the power generation device 1 is measured, and in the case of solar power generation, the movement of clouds or the like around the power generation device 1 is observed, whereby the input power generated by the power generation device 1 may be estimated. The distribution ratio by the first power distributor 24 is determined by the controller 26 described below based on these measured values, estimated values, and the like.

It should be noted that although the compressor 6 and the expander 10 of the present embodiment are screw type, the type of them is not limited, and may be scroll type, turbo type, reciprocating type, or the like. In the present embodiment, the number of each of the compressor 6 and the expander 10 is one, but the number is not particularly limited, and may be plurality being two or more.

In addition, the heat storage tank 20 is heat insulated. The heat storage tank 20 is fluidly connected to the first heat exchanger 16 and the second heat exchanger 18 respectively through heating medium supply passages 30a and 30b (see the one-dot chain line in FIG. 1). A heating medium flows in the heating medium supply passages 30a and 30b. The type of the heating medium is not limited, and it may be, for example, water, oil, or the like. The heating medium supply passages 30a and 30b include pumps 32a and 32b, respectively. The pump 32a circulates the heating medium between the heat storage tank 20 and the first heat exchanger 16 through the heating medium supply passage 30a. The pump 32b circulates the heating medium between the heat storage tank 20 and the first heat exchanger 16 through the heating medium supply passage 30b. Furthermore, the heat storage tank 20 includes a heater 22 for heating the heating medium therein. The heater 22 is an electric heater, and power is supplied from the power generator 12 through the first power distributor 24 to heat the heating medium.

In the first heat exchanger 16, heat exchange is performed between the compressed air in the air supply passage 28 between the compressor 6 and the accumulator tank 8 and the heating medium in the heating medium supply passage 30a, and the compression heat generated due to compression by the compressor 6 is recovered into the heating medium.

That is, in the first heat exchanger 16, the temperature of the compressed air falls, and the temperature of the heating medium rises. Here, the heating medium whose temperature has risen is supplied to the heat storage tank 20 to be stored.

In the second heat exchanger 18, heat exchange is performed between the compressed air in the air supply passage 28 between the accumulator tank 8 and the expander 10, and the heating medium in the heating medium supply passage 30b, and the temperature of the compressed air before expansion by the expander 10 is raised. That is, in the second heat exchanger 18, the temperature of the compressed air rises and the temperature of the heating medium falls. Here, the heating medium whose temperature has fallen is supplied to the heat storage tank 20 to be stored.

When the first heat exchanger 16 and the second heat exchanger 18 are used, the decrease in power generation efficiency can be prevented. When these are not used, the compressed air whose temperature is raised due to compression heat is supplied to the accumulator tank 8. The compressed air whose temperature has risen radiates heat to the outside while stored in the accumulator tank 8, and loses heat energy. In contrast to this, using the first heat exchanger 16 allows the temperature of the compressed air supplied to the accumulator tank 8 to be reduced to reduce the temperature difference from the outside air. Therefore, the loss of heat energy due to heat radiation in the accumulator tank 8 can be prevented. Furthermore, storing the recovered heat in the heat storage tank 20 and returning the recovered and stored heat to the compressed air to be supplied to the expander 10 by using the second heat exchanger 18 allows power generation without reducing the power generation efficiency.

According to this configuration, using surplus power for the heat storage allows the waste of power to be suppressed to improve the power generation efficiency, and reducing the capacity of the accumulator tank 8 in size allows the equipment cost to be reduced. The surplus power means the difference power between the generated power by the power generator 12 and the power demand. Usually, when the accumulator tank 8 cannot accumulate any more, the surplus power will be discarded. However, since heating the heating medium in the heat storage tank 20 by the heater 22 causes the heated heating medium to heat the compressed air before expansion in the second heat exchanger 18, the expander 10 can be driven with the heated compressed air to improve the expansion efficiency. In addition, the capacity of the accumulator tank 8 of the whole device 2 needs to be set depending on the peak of the power demand. However, since surplus power can be used for the heat storage with this configuration, waste of power can be suppressed, and even when an accumulation amount of the accumulator tank 8 exceeds the predetermined capacity and cannot accumulate any more, energy can be stored in another form of heat. Therefore, the capacity of the accumulator tank 8 does not need to be set depending on the peak of the power demand, and the capacity of the accumulator tank 8 can be reduced.

In addition, the CAES power generation device 2 includes the controller 26. The controller 26 is constructed by hardware including a sequencer and the like and software implemented in the hardware. The controller 26 of the present embodiment receives each value of the input power from the power generation device 1, the detected pressure value of the pressure sensor 14, the power demand of the external power system 25, and the generated power of the power generator 12. Then, the controller 26 controls the first power distributor 24 and the second power distributor 3 based on these values to switch the supply destination of the generated power and the supply destination of the input power as indicated by the following control method (see the two-dot chain line in FIG. 1).

Next, a control method of the CAES power generation device 2 according to the present embodiment will be described.

Figure 2:
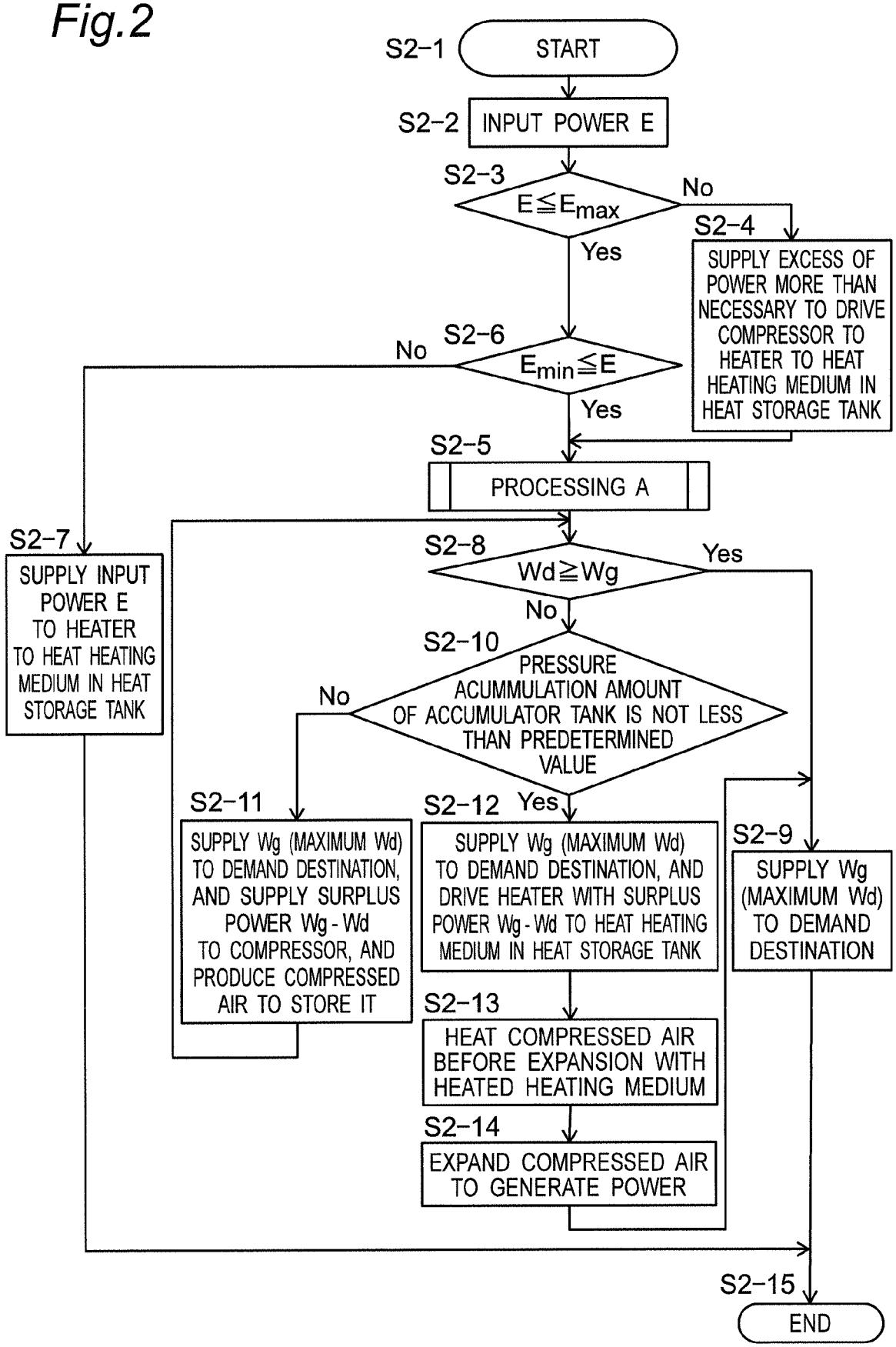
FIG. 2 is a flowchart showing a control method of the compressed air energy storage power generation device in FIG. 1.

FIG. 2 is a flowchart showing a control method of the CAES power generation device 2 according to the first embodiment. When the control is started (step S2-1) and the input power E is supplied to the motor 4 (step S2-2), the input power E is determined whether to be a predetermined value $E_{max}$ or less (step S2-3). The predetermined value $E_{max}$ is the maximum value that the compressor 6 can drive at predetermined compression efficiency or higher. Therefore, when the power that exceeds $E_{max}$ is supplied, compression occurs at a point away from the set point at which the compression efficiency is maximized, and the compression efficiency drops. Alternatively, larger power is a surplus power supply for driving the motor 4.

When the input power E exceeds the predetermined value $E_{max}$ (step S2-3), the power of the part exceeding the $E_{max}$ out of the input power E is supplied to the second heater 22 to be used for heating the heating medium in the heat storage tank 20 (step S2-4). Then, processing A shown in FIG. 3 is executed (step S2-5).

Figure 3:
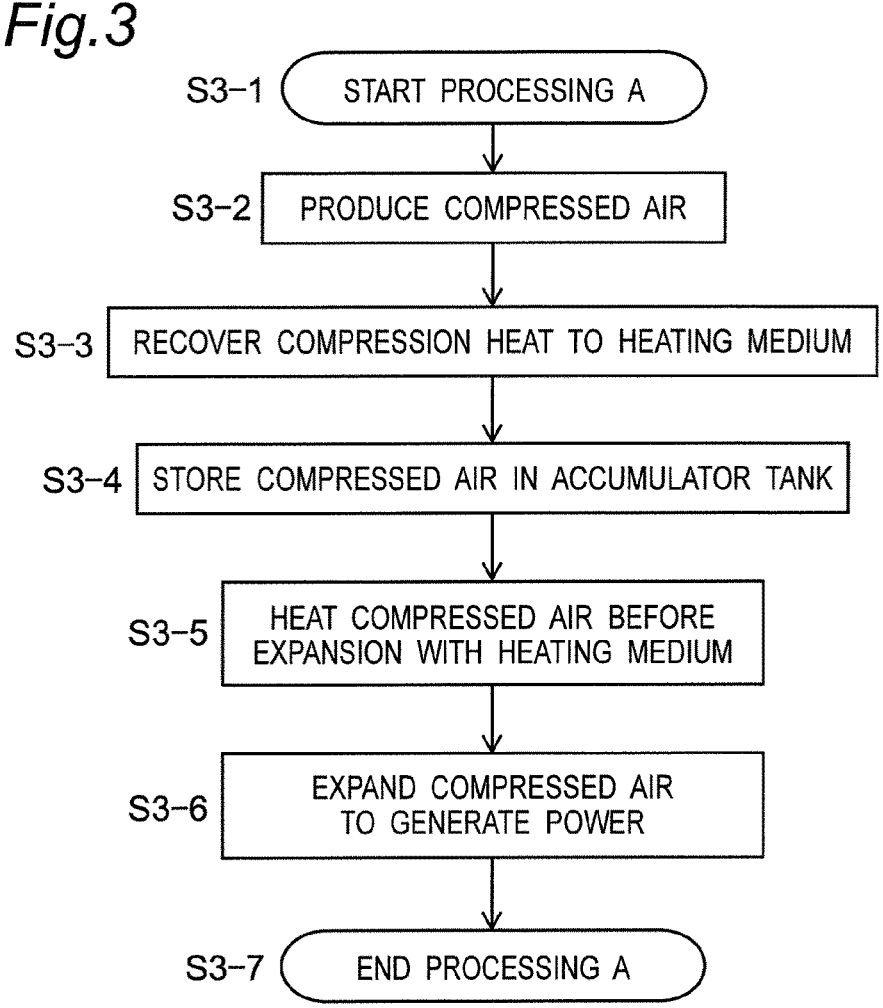
FIG. 3 is a sub-flowchart showing the processing A in FIG. 2.

With reference to FIG. 3, when the processing A is started (step S3-1), the motor 4 is driven with the input power to produce compressed air in the compressor 6 (step S3-2), the compression heat at the time of compression is recovered into the heating medium by the first heat exchanger 16 (step S3-3), and the recovered heating medium is stored in the heat storage tank 20. The compressed air whose heat is recovered and whose temperature is reduced is stored in the accumulator tank 8 (step S3-4). The compressed air supplied from the accumulator tank 8 to the expander 10 is heated with the heating medium in the second heat exchanger 18 (step S3-5). Expanding the compressed air in the expander 10 causes the power generator 12 to generate power (step S3-6). Then, the processing A is ended (step S3-7).

When the input power E is the predetermined value $E_{max}$ or less (step S2-3), further, the input power E is determined whether to be a predetermined value $E_{min}$ or more (step S2-6). The predetermined value $E_{min}$ is the minimum value that the compressor 6 can drive at predetermined compression efficiency or higher. Therefore, even when the power less than $E_{min}$ is supplied, compression occurs at a point away from the set point at which the compression efficiency is maximized, and the compression efficiency drops. Alternatively, smaller power cannot even drive the motor 4, and even when the power is supplied, the power will be wasted.

Figure 4:
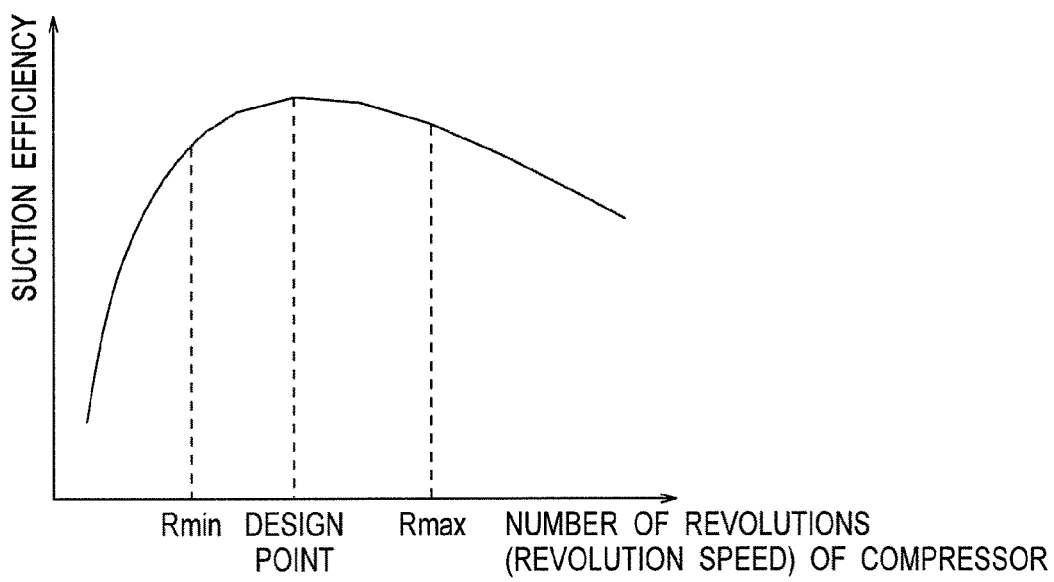
FIG. 4 is a graph showing the relationship between the number of revolutions (revolution speed) and the suction efficiency of a compressor.

FIG. 4 is a graph showing a range in which the compressor 6 can operate at the suction efficiency of a certain value or higher. The horizontal axis represents the number of revolutions (revolution speed) R of the compressor 6, and the vertical axis represents the suction efficiency of the compressor. In order to operate the compressor 6 at the suction efficiency of a certain value or higher, the number of revolutions R in a predetermined range ($R_{min} \leq R \leq R_{max}$) is needed. This corresponds to that the input power E needs to be in a predetermined range ($E_{min} \leq E \leq E_{max}$) in order for the compressor 6 to operate at certain operation efficiency or higher.

With reference to FIG. 2, the input power E is checked whether to be in the predetermined range ($E_{min} \leq E \leq E_{max}$) in steps S2-3 and S2-6, and the compressor 6 is determined whether to be operable at certain efficiency or higher. When the input power E is less than the predetermined value $E_{min}$ (step S2-6), the input power E is supplied to the heater 22 to heat the heating medium in the heat storage tank 20 (step S2-7). When the input power E is the predetermined value $E_{min}$ or more (step S2-6), the processing A shown in FIG. 3 is executed (step S2-5). In addition to the magnitude of the input power E, the operation efficiency may be determined by checking the number of revolutions through the inverter (not shown) connected to the compressor 6 as described above.

After the end of the processing A (step S2-5), the power demand Wd is determined whether to be the generated power Wg or more (step S2-8). When the power demand Wd is the generated power Wg or more, since surplus power does not exist, all the generated power Wg (maximum Wd) is supplied to the external power system 25 being a demand destination (step S2-9). When the power demand Wd is less than the generated power Wg, the accumulation amount of the accumulator tank 8 is determined whether to be the predetermined value or more (step S2-10). Specifically, the internal pressure of the accumulator tank 8 detected by the pressure sensor 14 is determined whether to be the predetermined pressure or more. For example, in the present embodiment, this predetermined pressure is set to a pressure value at which the compressed air cannot be pumped any further from the compressor 6 to the accumulator tank 8.

When the accumulation amount of the accumulator tank 8 is less than the predetermined pressure, part of the generated power Wg (maximum Wd) is supplied to the external power system 25, and the surplus power (Wg-Wd) is supplied to the motor 4 of the compressor 6, so that the compressed air is manufactured to be stored (step S2-11). When the accumulation amount of the accumulator tank 8 is the predetermined value or more, part of the generated power Wg (maximum Wd) is supplied to the external power system 25, and the surplus power (Wg-Wd) is supplied to the heater 22 because it cannot be accumulated any more, so that the heating medium in the heat storage tank 20 is heated (step S2-12). Then, the compressed air before expansion is heated with the heating medium heated in the second heat exchanger 18 (step S2-13), the compressed air is expanded in the expander 10 and power is generated by the power generator 12 (step S2-14), and the generated power Wg is supplied to the external power system 25 being a demand destination (step S2-9). After completing these processes, the control is ended (step S2-15).

It should be noted that although the control is ended here, the control is always performed during operation, and when the input power E is again supplied to the motor 4, the processing is started again from step S2-1. This also applies to the control flow in the following embodiments.

Thus, when the accumulator tank 8 cannot accumulate any more, since supplying surplus power to the heater 22 to use for heat storage allows the generated power Wg to be prevented from being wasted, the power generation efficiency of the power generator 12 can be improved.

In addition, although the input power E so small or so large that the efficiency of the compressor 6 is a certain value or less is usually useless to be discarded, this input power E so small or so large can also be used for heat storage in this configuration.

Second Embodiment

Figure 5:
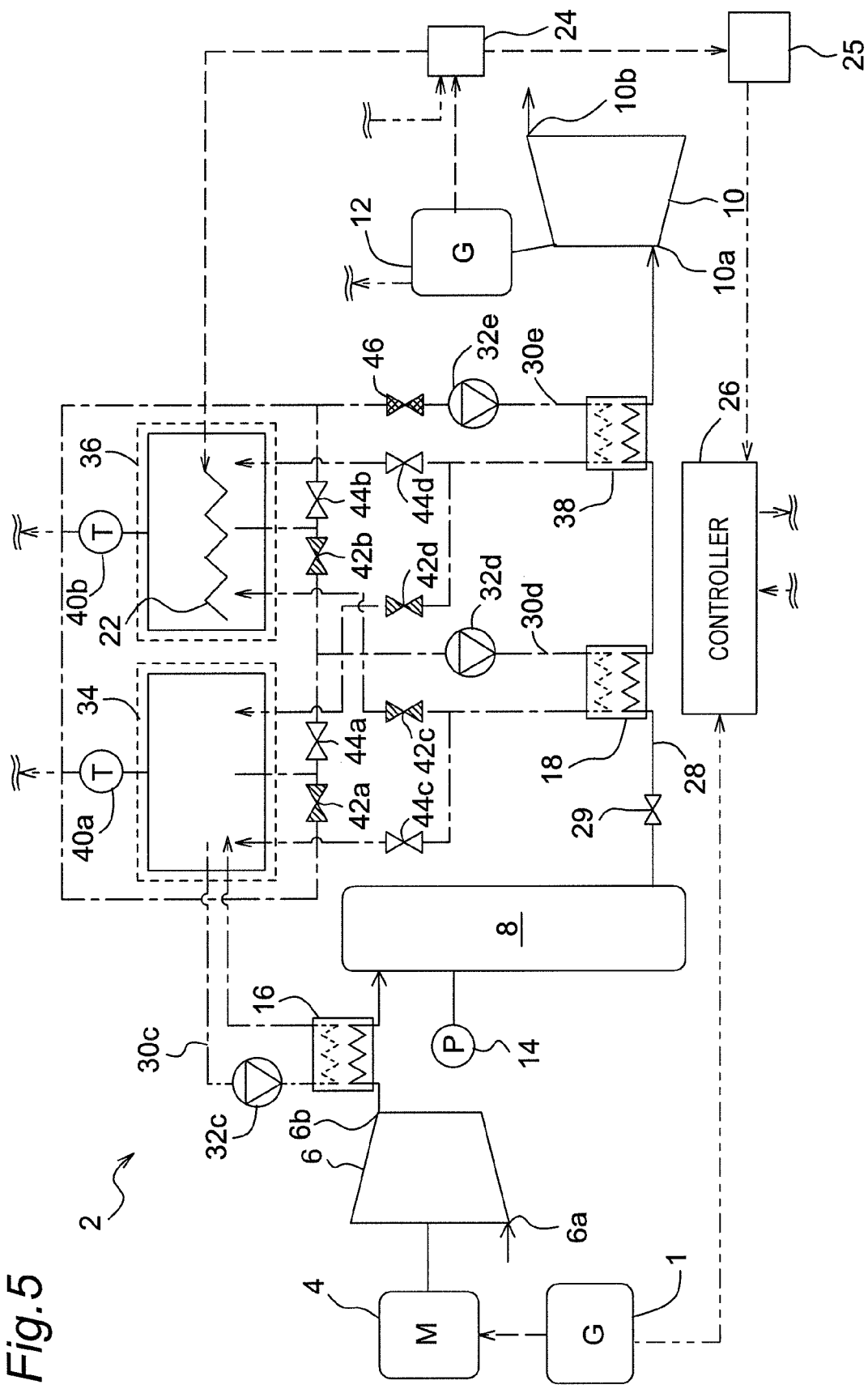
FIG. 5 is a schematic configuration diagram of a compressed air energy storage power generation device of a second embodiment.

FIG. 5 shows the CAES power generation device 2 of the second embodiment. In the CAES power generation device 2 of the present embodiment, the configurations other than the parts related to the second power distributor 3 (see FIG. 1), a first heat storage tank 34, a second heat storage tank 36, and a third heat exchanger 38 are substantially the same as those of the first embodiment in FIG. 1. Therefore, the parts having the same configurations as those shown in FIG. 1 are denoted by the same reference signs, and description thereof will be omitted.

With reference to FIG. 5, in the present embodiment, the second power distributor 3 (see FIG. 1) is omitted, and the first heat storage tank 34 and the second heat storage tank 36 are provided. Both the first heat storage tank 34 and the second heat storage tank 36 are heat-insulated. The first heat storage tank 34 and the second heat storage tank 36 respectively include a first temperature sensor 40a and a second temperature sensor 40b for detecting the temperatures of the first heating medium and the second heating medium inside. The types of the first heating medium and the second heating medium may be the same or different. For example, water, oil, or the like may be used. A heater 22 is disposed in the second heat storage tank 36. The heater 22 is electrically connected to the power generator 12.

The first heat exchanger 16 is fluidly connected to the compressor 6 and the accumulator tank 8 through the air supply passage 28. In addition, the first heat exchanger 16 is fluidly connected to the first heat storage tank 34 through a heating medium supply passage 30c. A pump 32c for flowing and circulating the inside first heating medium is disposed in the heating medium supply passage 30c. The temperature of the compressed air falls, and the temperature of the first heating medium rises due to the heat exchange in the first heat exchanger 16.

The second heat exchanger 18 is fluidly connected to the accumulator tank 8 and the third heat exchanger 38 through the air supply passage 28. In addition, the second heat exchanger 18 is fluidly connected to the first heat storage tank 34 and the second heat storage tank 36 through a heating medium supply passage 30d. A pump 32d for flowing and circulating the first heating medium or the second heating medium inside is disposed in the heating medium supply passage 30d. The temperature of the compressed air rises and the temperature of the first heating medium or the second heating medium falls due to the heat exchange in the second heat exchanger 18.

The third heat exchanger 38 is fluidly connected to the second heat exchanger 18 and the expander 10 through the air supply passage 28. In addition, the third heat exchanger 38 is fluidly connected to the first heat storage tank 34 and the second heat storage tank 36 through a heating medium supply passage 30e. A pump 32e for flowing and circulating the first heating medium or the second heating medium inside is disposed in the heating medium supply passage 30e. The temperature of the compressed air rises and the temperature of the first heating medium or the second heating medium falls due to the heat exchange in the third heat exchanger 38.

The connection between the first heat storage tank 34, the second heat storage tank 36, the first heat exchanger 16, and the second heat exchanger 18 is performed through switching valves (heat exchange sequence switchers) 42a to 42d, 44a to 44d, and 46. Therefore, the heating medium of the first heat storage tank 34 can be supplied to any of the first heat exchanger 16 and the second heat exchanger 18, and is separated from the heating medium of the second heat storage tank 36. In the same manner, the heating medium of the second heat storage tank 36 can be supplied to any of the second heat exchanger 18 and the third heat exchanger 38, and is separated from the heating medium of the first heat storage tank 34. Although sharing the heating medium supply passages 30d and 30e, the first heating medium and the second heating medium do not flow through the same heating medium supply passage 30d or 30e at the same time.

According to this configuration, since the first heating medium for recovering the compression heat and the second heating medium heated by the heater 22 can be separated, the power generation efficiency can be further improved. Heating the heating medium with the compression heat or the heater 22 usually has different temperatures of the heating medium. Therefore, separating the two heating mediums from each other allows the heat storage at different temperatures. For this reason, the power generation efficiency can be further improved.

The controller 26 of the present embodiment receives the outputs of the input power from the power generation device 1, the detected pressure value of the pressure sensor 14, the detected temperature values of the temperature sensors 40a and 40b, the power demand of the external power system 25, and the generated power of the power generator 12, and based on these values, as shown in the following control method, controls the first power distributor 24 so as to switch the supply destination of the generated power (see the two-dot chain line in FIG. 5), and controls the switching valves 42a to 42d, 44a to 44d, and 46 so as to switch the heating medium flow passage.

Figure 6:
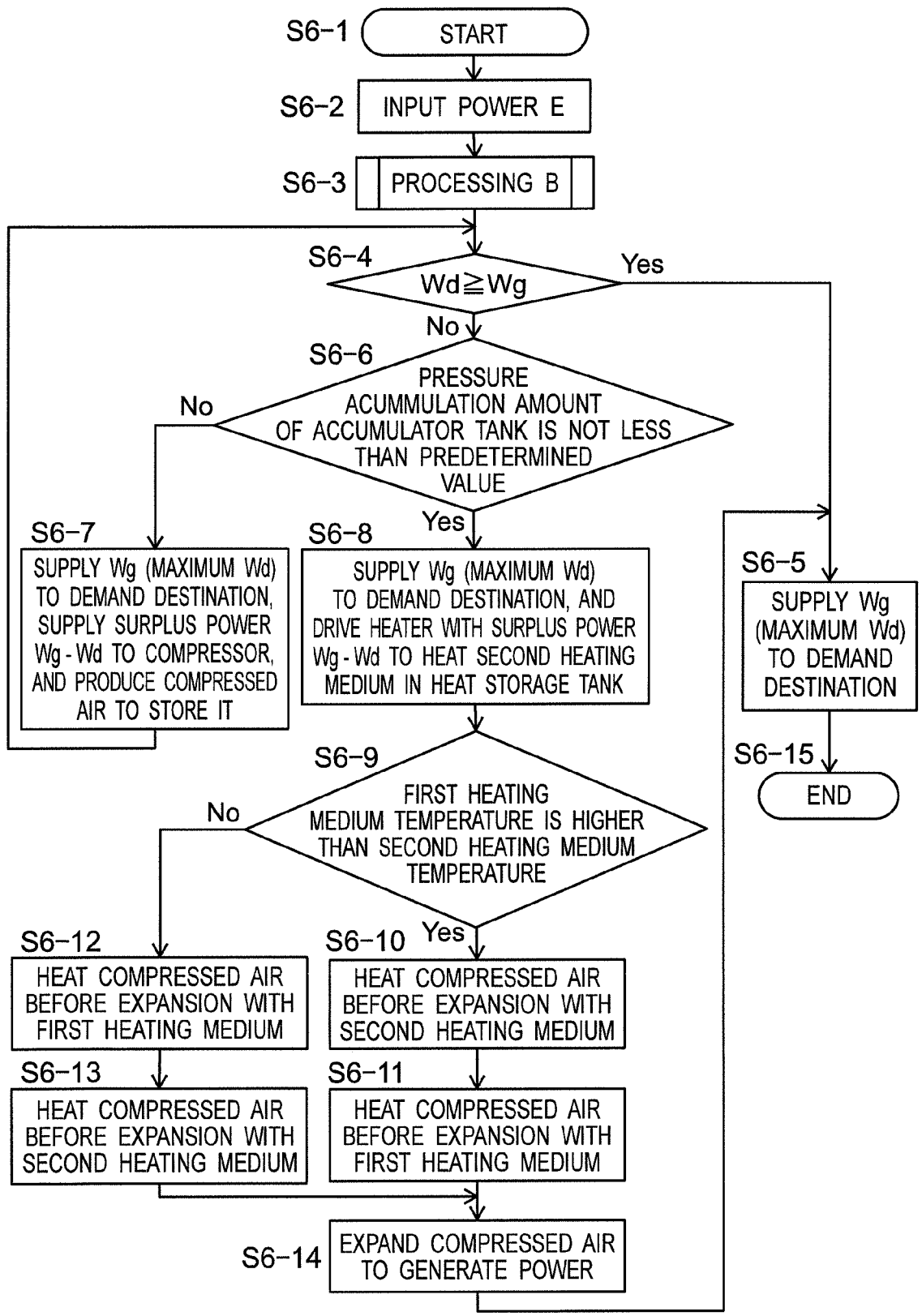
FIG. 6 is a flowchart showing a control method of the compressed air energy storage power generation device in FIG. 5.

FIG. 6 is a flowchart showing a control method of the CAES power generation device 2 according to the second embodiment. Steps S6-1 to S6-8 of the present embodiment are substantially the same as steps S2-1 to S2-12 of the first embodiment shown in FIG. 2. Therefore, the description of the same steps will be omitted. However, in the second embodiment, unlike the first embodiment, the processes of determining the magnitude of the input power E (steps S2-3, S2-4, S2-6, and S2-7) are omitted, and in step S6-3, processing B is executed instead of the processing A.

Figure 7:
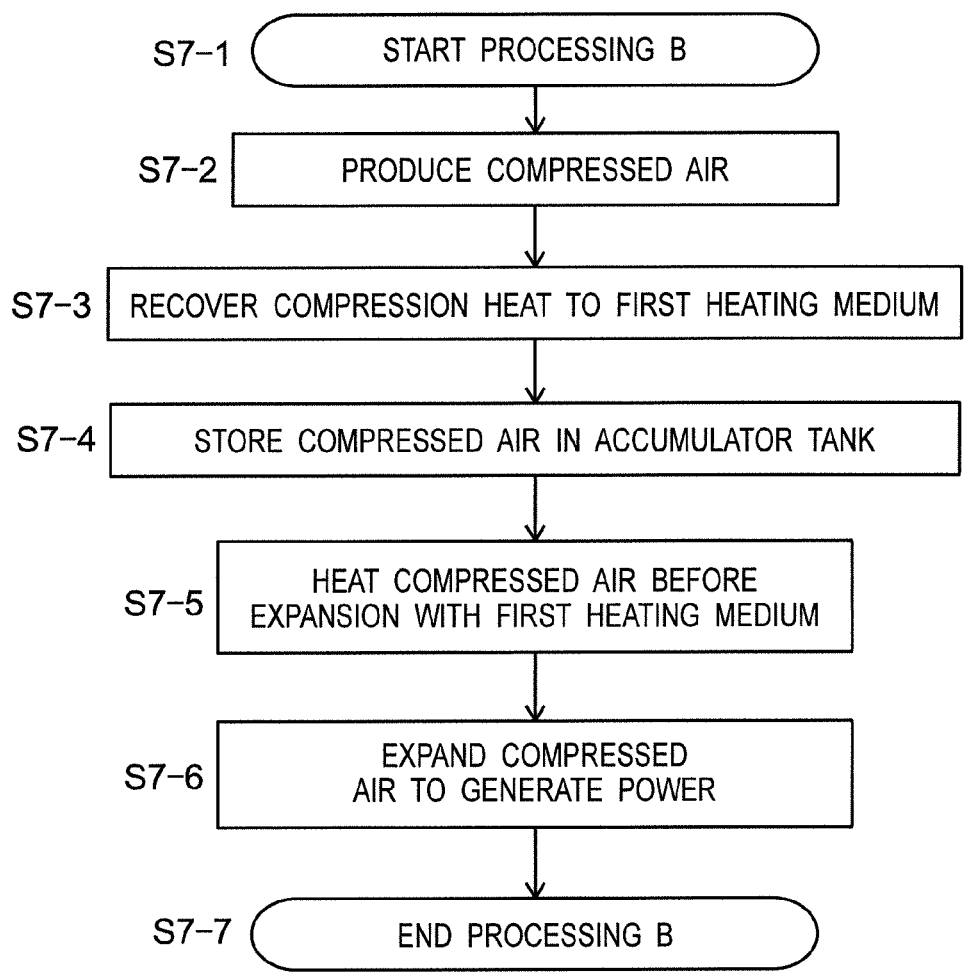
FIG. 7 is a sub-flowchart showing the processing B in FIG. 6.

With reference to the processing A in FIG. 3 and the processing B in FIG. 7, the difference between them is that the heating medium in steps S3-3 and S3-5 is replaced with the first heating medium in S7-3 and S7-5. This is because two heating mediums of the first and second heating mediums are used in the present embodiment as against one heating medium in the first embodiment. However, the first and second heating mediums are not limited to different types, and the same heating medium may be used.

With reference to FIGS. 5 and 6, after the second heating medium is heated in step S6-8, the first heating medium temperature detected by the temperature sensor 40a is determined whether to be higher than the second heating medium temperature detected by the temperature sensor 40b (step S6-9). When the first heating medium temperature is higher than the second heating medium temperature, the switching valves 42a to 42d, and 46 are opened and the switching valves 44a to 44d are closed. Thus, the second heating medium exchanges heat with the compressed air in the second heat exchanger 18 (step S6-10), and then the first heating medium exchanges heat with the compressed air in the third heat exchanger 38 (step S6-11). In addition, when the first heating medium temperature is lower than the second heating medium temperature, the switching valves 42a to 42d are closed, and the switching valves 44a to 44d, and 46 are opened. Thus, the first heating medium exchanges heat with the compressed air in the second heat exchanger 18 (step S6-12), and then the second heating medium exchanges heat with the compressed air in the third heat exchanger 38 (step S6-13). That is, between the first heating medium and the second heating medium, the heating medium having a lower temperature first exchanges heat with the compressed air. Then, the heated compressed air drives the expander 10 to cause the power generator 12 to generate power (step S6-14). The generated power Wg is supplied to the external power system 25 (step S6-5). After completing these processes, the control is ended (step S6-15).

In this way, the temperature of the compressed air heated with the heating medium having a higher temperature between the first heating medium and the second heating medium is not lowered. Therefore, the heat exchange efficiency can be improved, and since the compressed air before expansion can be heated to a higher temperature, the power generation efficiency can be improved.

Third Embodiment

Figure 8:
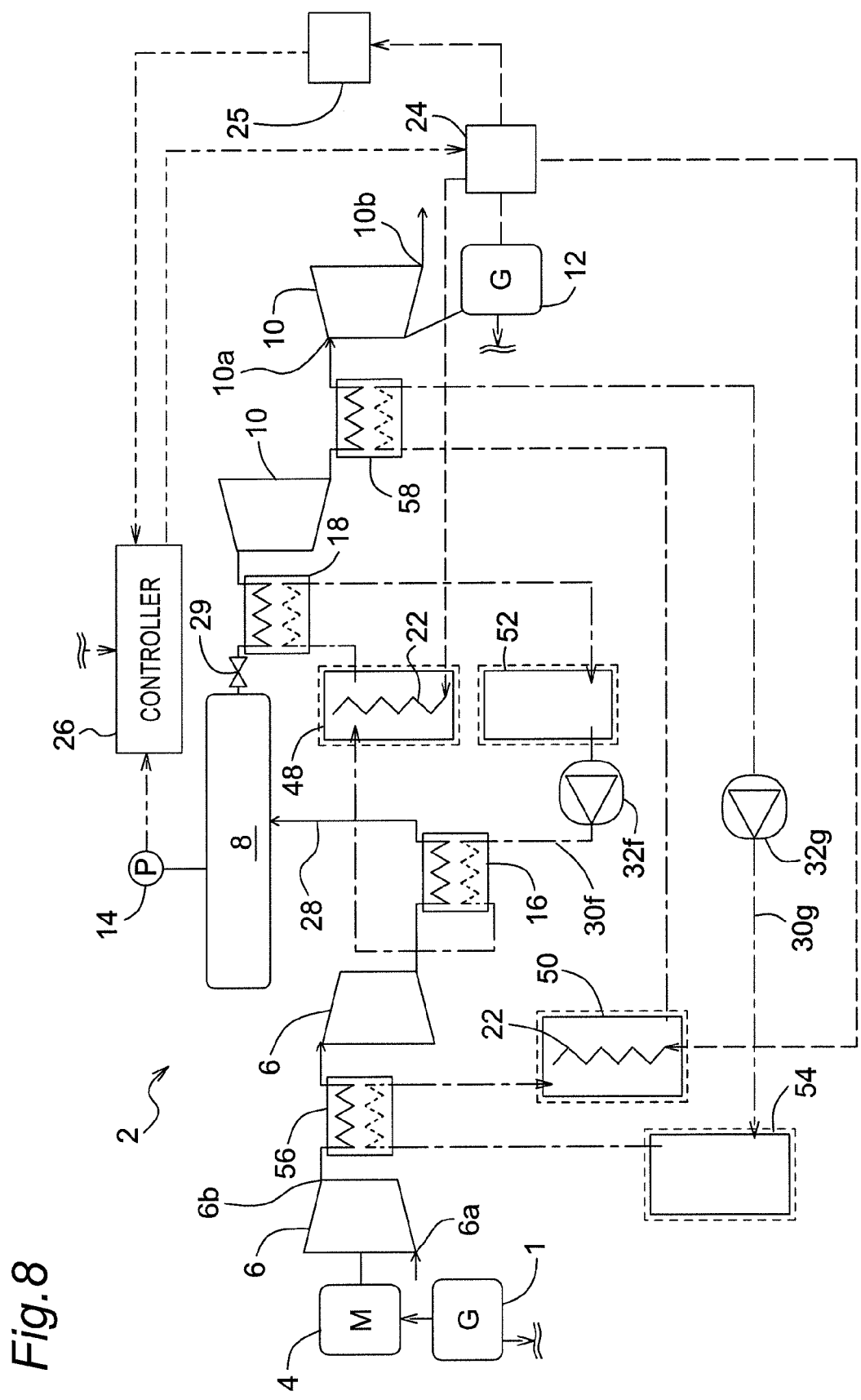
FIG. 8 is a schematic configuration diagram of a compressed air energy storage power generation device of a third embodiment.

FIG. 8 shows the CAES power generation device 2 of the third embodiment. In the CAES power generation device 2 of the present embodiment, the configurations other than the parts related to the second power distributor 3 (see FIG. 1), a first heating medium supply tank 48, a second heating medium supply tank 50, a first heating medium return tank 52, a second heating medium return tank 54, a fourth heat exchanger 56, and a fifth heat exchanger 58, and other than the compressor 6 and the expander 10 being multistage type are the same as those of the first embodiment in FIG. 1. Therefore, the parts having the same configurations as those shown in FIG. 1 are denoted by the same reference signs, and description thereof will be omitted.

With reference to FIG. 8, in the present embodiment, the second power distributor 3 is omitted, and the heat-insulated heat storage tanks 48, 50, 52, and 54 are provided for each temperature. Specifically, the first heating medium supply tank 48, the second heating medium supply tank 50, the first heating medium return tank 52, and the second heating medium return tank 54 are provided. In addition, the first heat exchanger 16, the second heat exchanger 18, the fourth heat exchanger 56, and the fifth heat exchanger 58 corresponding to these are provided.

The first heating medium supply tank 48 and the first heating medium return tank 52 are fluidly connected to the first heat exchanger 16 and the second heat exchanger 18 through a heating medium supply passage 30f. A pump 32f for flowing and circulating the inside heating medium is disposed in the heating medium supply passage 30f. The first heating medium supply tank 48 stores a heating medium whose temperature has risen by exchanging heat with compressed air in the first heat exchanger 16. The first heating medium return tank 52 stores a heating medium whose temperature has fallen by exchanging heat with compressed air in the second heat exchanger 18.

The second heating medium supply tank 50 and the second heating medium return tank 54 are fluidly connected to the fourth heat exchanger 56 and the fifth heat exchanger 58 through a heating medium supply passage 30g. A pump 32g for flowing and circulating the inside heating medium is disposed in the heating medium supply passage 30g. The second heating medium supply tank 50 stores a heating medium whose temperature has risen by exchanging heat with compressed air in the fourth heat exchanger 56. The second heating medium return tank 54 stores a heating medium whose temperature has fallen by exchanging heat with compressed air in the fifth heat exchanger 58.

The compressor 6 and the expander 10 of the present embodiment are two-stage type. The compression heat in the first stage is recovered by the fourth heat exchanger 56, and the compression heat in the second stage is recovered by the first heat exchanger 16. In addition, the compressed air before expansion is heated by the second heat exchanger 18, and after the expansion in the first stage, the compressed air is heated by the fifth heat exchanger 58.

Thus, separating the heat storage tank 20 into the heating medium supply tanks 48 and 50 and the heating medium return tanks 52 and 54 allows the management of heating medium by temperatures. Therefore, the heat exchange efficiency can be improved and the power generation efficiency can be improved.

It should be noted that in the present embodiment, the two-stage compressor 6 and expander 10 are disposed, but the present invention is not limited thereto, and they may be a single-stage type or a multi-stage type having three or more stages.

Figure 11:
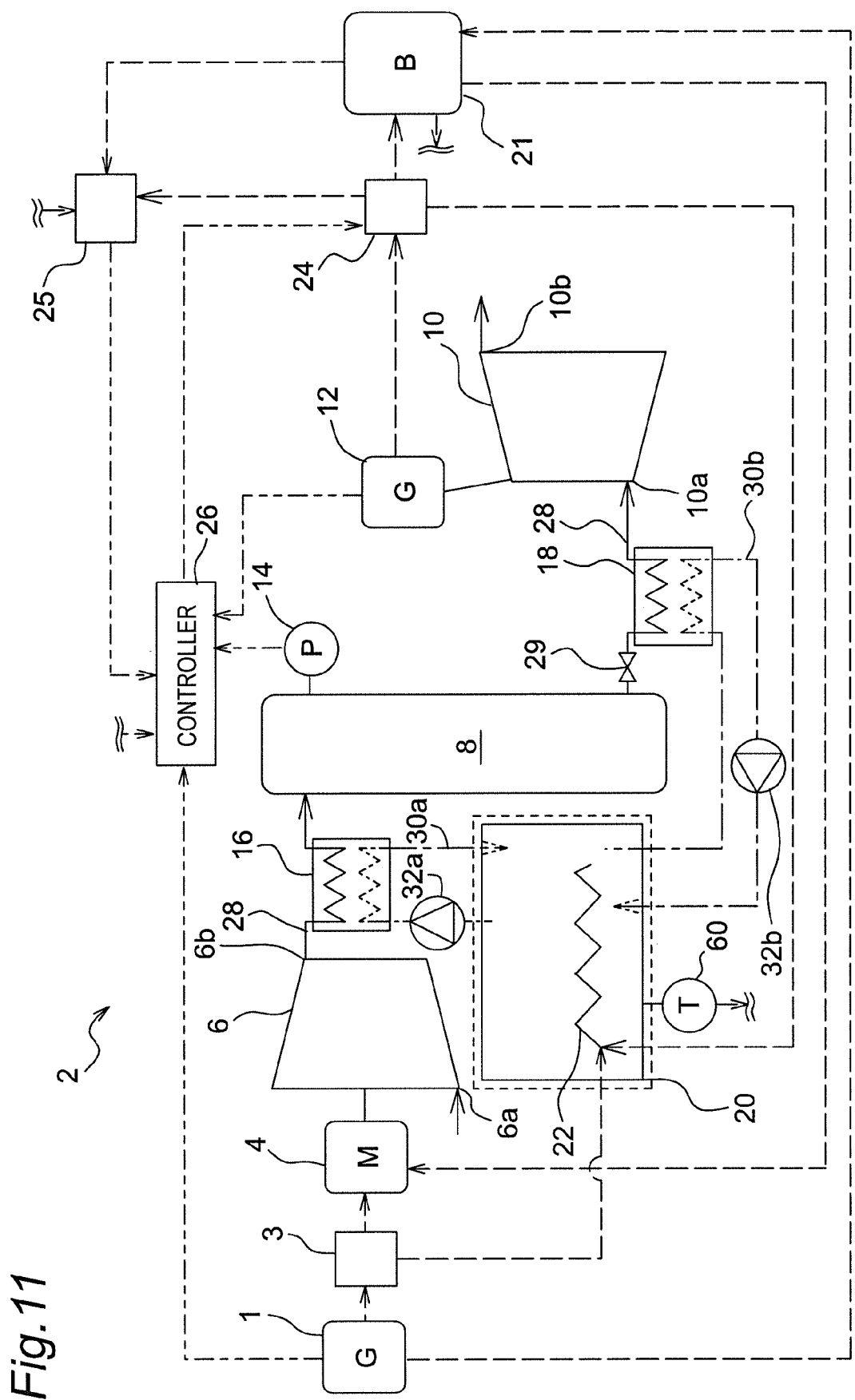
FIG. 11 is a schematic configuration diagram of a compressed air energy storage power generation device of a fifth embodiment.

The controller 26 of the present embodiment receives the outputs of the input power from the power generation device 1, the detected pressure value of the pressure sensor 14, the power demand of the external power system 25, and the generated power of the power generator 12, and based on these values, controls the first power distributor 24 so as to switch the supply destination of the generated power (see the two-dot chain line in FIG. 11).

Since the control method of the present embodiment is substantially the same as the control method of the first embodiment shown in FIG. 2 except for the part relating to the second power distributor 3 (see FIG. 1), description thereof will be omitted.

Fourth Embodiment

Figure 9:
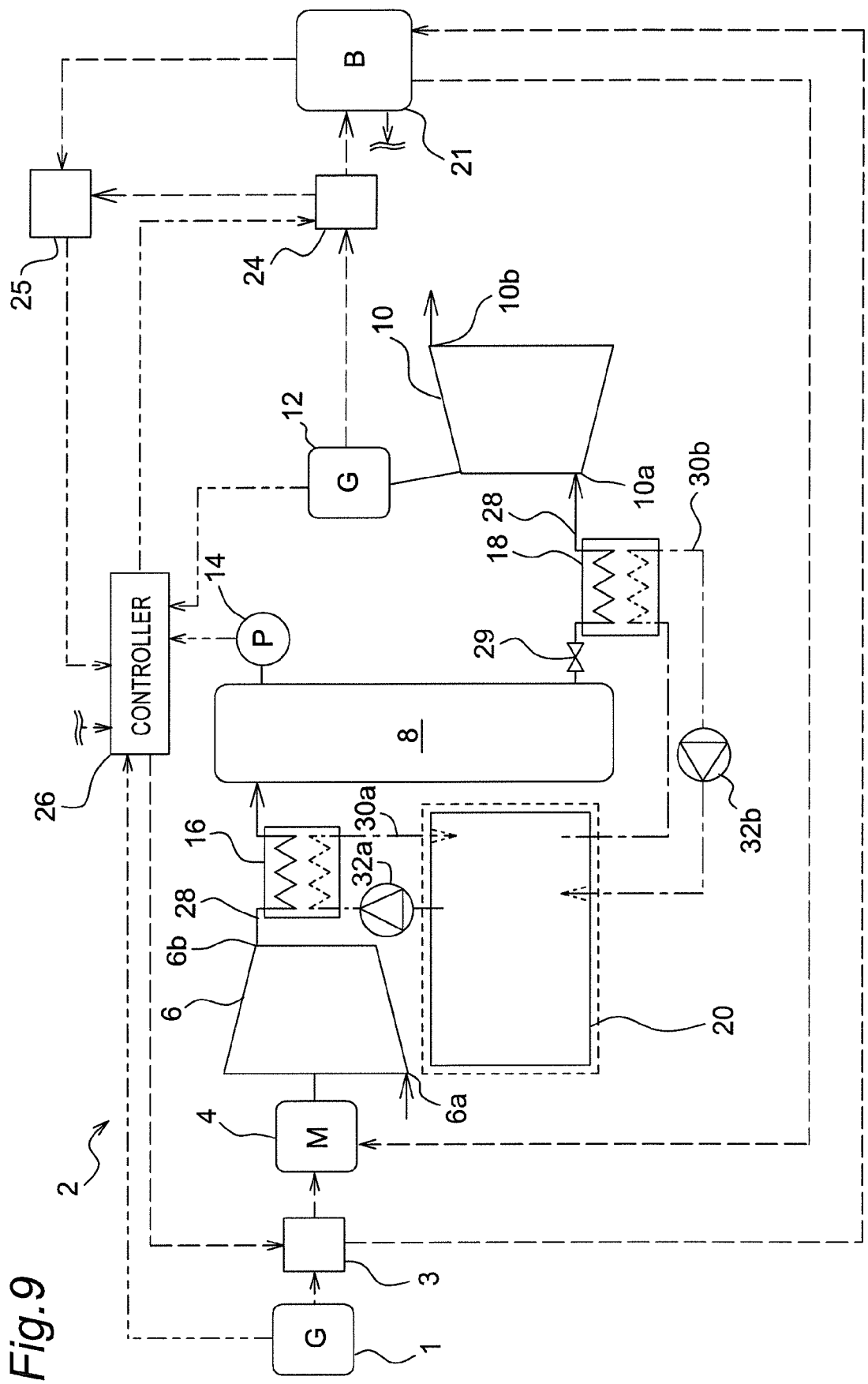
FIG. 9 is a schematic configuration diagram of a compressed air energy storage power generation device of a fourth embodiment.

FIG. 9 shows the CAES power generation device 2 of the fourth embodiment. In the CAES power generation device 2 of the present embodiment, the configurations other than the parts related to the heater 22 (see FIG. 1) and a power storage device 21 are the same as those of the first embodiment in FIG. 1. Therefore, the parts having the same configurations as those shown in FIG. 1 are denoted by the same reference signs, and description thereof will be omitted.

As shown in FIG. 9, in the CAES power generation device 2 of the present embodiment, the heater 22 (FIG. 1) is omitted and the power storage device 21 is provided. The power storage device 21 may be anything as long as it can store electric energy, such as a storage battery or a capacitor, and the type thereof is not particularly limited. The power storage device 21 is electrically connected to the power generator 12 through the first power distributor 24, and stores the surplus power generated by the power generator 12. The remaining power stored in the power storage device 21 can be grasped with a wattmeter or the like not shown. Furthermore, the power storage device 21 is electrically connected to the power generation device 1 through the second power distributor 3, and stores the input power generated by the power generation device 1. In addition, the power storage device 21 is electrically connected to the motor 4 and can supply the stored power. In addition, the power storage device 21 is also electrically connected to the power generation device 1 through the second power distributor 3, and can store the input power. Furthermore, the power storage device 21 is electrically connected to the power system 25 and can supply the stored power.

Therefore, the first power distributor 24 of the present embodiment distributes the power from the power generator 12 to the power system 25 and the power storage device 21. In addition, the second power distributor 3 distributes the power from the power generation device 1 to the motor 4 and the power storage device 21.

The controller 26 of the present embodiment receives each value of the input power from the power generation device 1, the detected pressure value of the pressure sensor 14, the power demand of the external power system 25, the generated power of the power generator 12, and the remaining power of the power storage device 21. Then, the controller 26 controls the first power distributor 24 and the second power distributor 3 based on these values to switch the supply destination of the generated power and the supply destination of the input power as indicated by the following control method (see the two-dot chain line in FIG. 9).

Figure 10:
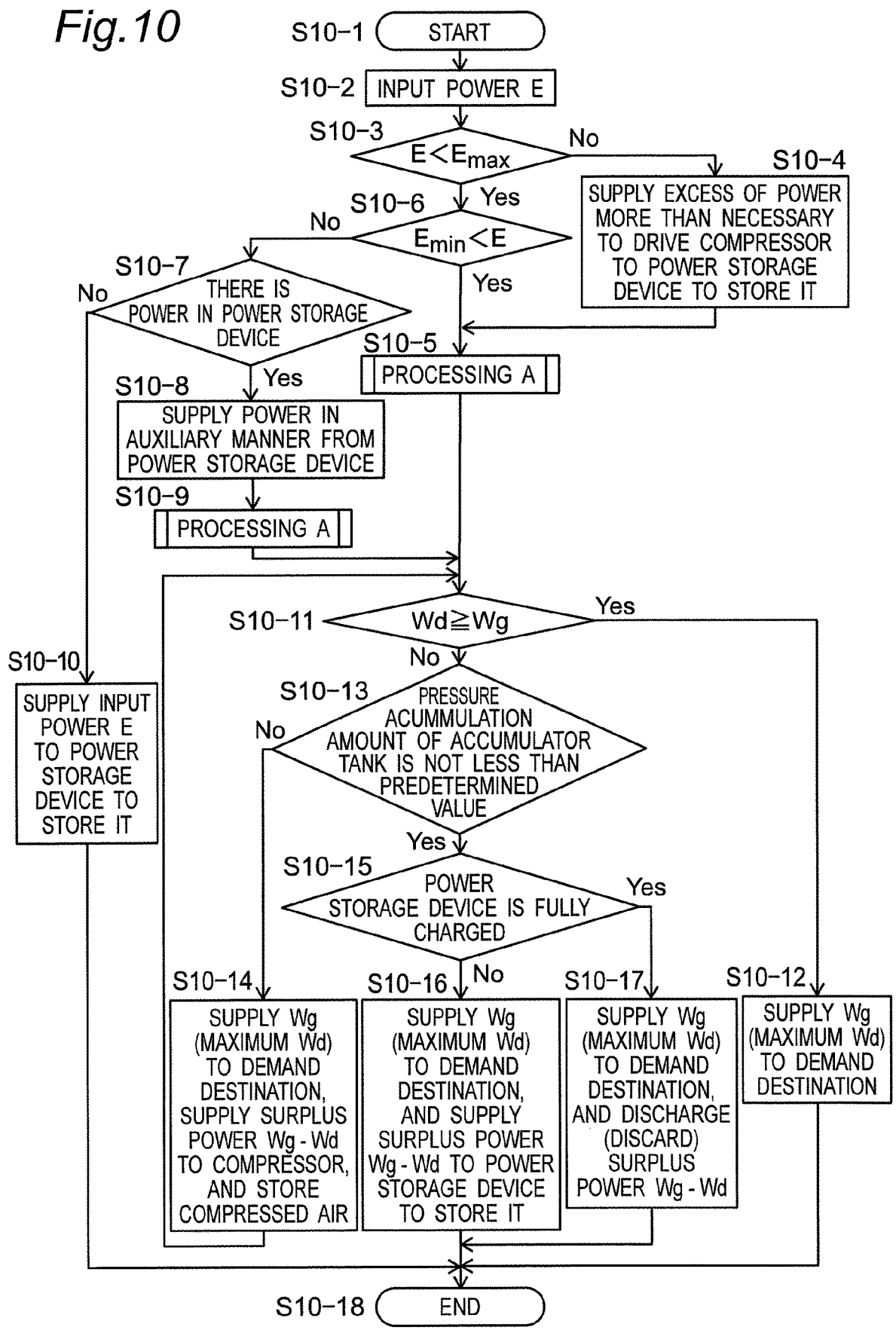
FIG. 10 is a flowchart showing a control method of the compressed air energy storage power generation device in FIG. 9.

FIG. 10 is a flowchart showing a control method of the CAES power generation device 2 according to the fourth embodiment. Since the control method of the present embodiment is approximately the same as the control method of the first embodiment shown in FIG. 2, only different points are shown.

In the present embodiment, for an input power E so large that the operation efficiency of the compressor 6 is a predetermined value or less, the power more than necessary for driving the compressor 6 is supplied to the power storage device 21 (step S10-4). In addition, for an input power E so small that the operation efficiency of the compressor 6 is the predetermined value or less, when there is power left in the power storage device 21 (step S10-7), the power is supplied in an auxiliary manner from the power storage device 21 to the motor 4 so that the input power E becomes the predetermined value $E_{min}$ or more (step S10-8), and then the processing A is executed (step S10-9). When there is no power in the power storage device 21 (step S10-7), the input power E is supplied to the power storage device 21 to be stored (step S10-10).

Thus, the input power E so small or the input power E so large that the operation efficiency of the compressor 6 is the predetermined value or less can also be effectively used by being stored. In addition, even when the input power E supplied to the motor 4 is the predetermined value $E_{min}$ or less, supplying power in an auxiliary manner from the power storage device 21 to the motor 4 causes the power of the predetermined value $E_{min}$ or more to be supplied to the motor 4, and a decrease in operation efficiency can be prevented.

With reference to FIG. 10, when the internal pressure of the accumulator tank 8 is a predetermined pressure or more (step S10-13), the power storage device 21 is determined whether to be fully charged (step S10-15). When the power storage device 21 is not fully charged, part of the generated power Wg (maximum Wd) is supplied to the external power system 25, and the surplus power (Wg-Wd) is supplied to the power storage device 21 to be stored (step S10-16). When the power storage device 21 is fully charged, part of the generated power Wg (maximum Wd) is supplied to the external power system 25, and since the power cannot be charged any further, the surplus power (Wg-Wd) is discharged (discarded) (step S10-17).

Thus, using surplus power for power storage allows the waste of power to be suppressed to improve the power generation efficiency, and reducing the capacity of the accumulator tank 8 in size allows the equipment cost to be reduced.

Fifth Embodiment

FIG. 11 shows the CAES power generation device 2 of the fifth embodiment. The CAES power generation device 2 of the present embodiment includes both the power storage device 21 and the heater 22. The configurations other than the parts related to the power storage device 21 and the heater 22 are the same as those of the first embodiment in FIG. 1 and the fourth embodiment in FIG. 9. Therefore, the parts having the same configurations as those shown in FIG. 1 and FIG. 9 are denoted by the same reference signs, and description thereof will be omitted.

The CAES power generation device 2 of the present embodiment includes both the power storage device 21 and the heater 22. Therefore, the first power distributor 24 of the present embodiment distributes the power from the power generator 12 to the power system 25, the power storage device 21, and the heater 22. In addition, the second power distributor 3 distributes the input power from the power generation device 1 to the motor 4, the power storage device 21, and the heater 22.

The heat storage tank 20 includes a heat storage temperature sensor 60 for measuring the temperature of the internal heating medium. The temperature sensor 60 outputs the measured value to the controller 26.

The controller 26 of the present embodiment receives each value of the input power from the power generation device 1, the detected pressure value of the pressure sensor 14, the detected temperature value of the temperature sensor 60, the power demand of the external power system 25, the generated power of the power generator 12, and the remaining power of the power storage device 21. Then, the controller 26 controls the first power distributor 24 and the second power distributor 3 to switch the supply destination of the generated power based on these values (see the two-dot chain line in FIG. 11). The control method for the supply destination switching of the generated power includes the first control method and the second control method described below.

(First Control Method)

Figure 12:
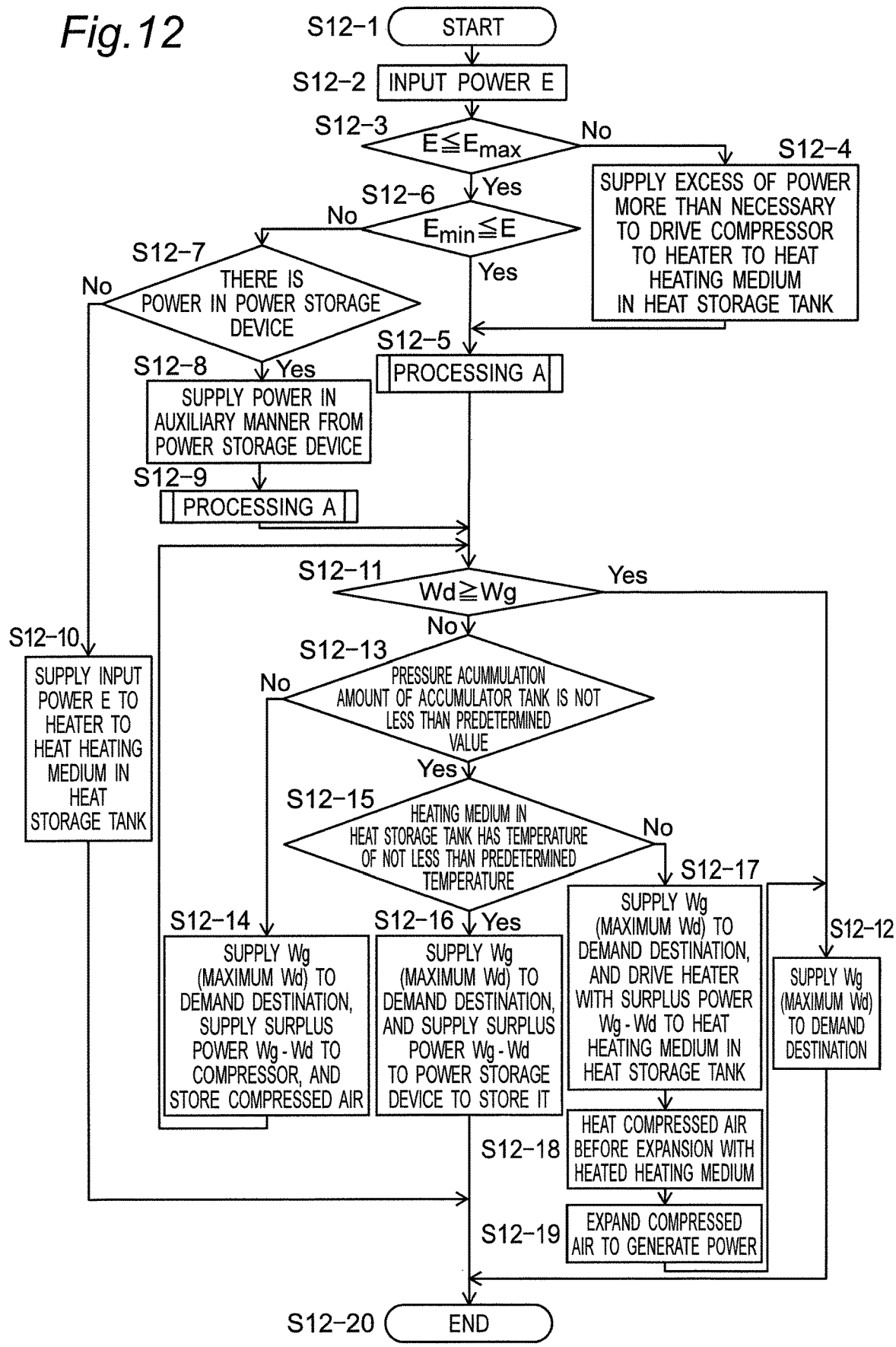
FIG. 12 is a flowchart showing a first control method of the compressed air energy storage power generation device in FIG. 11.

FIG. 12 is a flowchart showing the first control method of the CAES power generation device 2 according to the fifth embodiment. Since the first control method of the present embodiment is approximately the same as the control method of the first embodiment shown in FIG. 2, only different points are shown.

When the input power E is smaller than the predetermined value $E_{min}$ (step S12-6) and when there is power left in the power storage device 21 (step S12-7), power is supplied in an auxiliary manner from the power storage device 21 to the motor 4 so that the input power E becomes the predetermined value $E_{min}$ or more (step S12-8), and then the processing A is executed (step S12-9). When there is no power in the power storage device 21 (step S12-7), the first power distributor 24 is switched to supply the input power E to the heater 22 to heat the heating medium in the heat storage tank 20 (step S12-10).

When the heating medium in the heat storage tank 20 has the predetermined temperature or more (step S12-15), part of the generated power Wg (maximum Wd) is supplied to the external power system 25, and the surplus power (Wg-Wd) is supplied to the power storage device 21 to be stored (step S12-16). When the heating medium in the heat storage tank 20 has a temperature less than the predetermined temperature (step S12-15), part of the generated power Wg (maximum Wd) is supplied to the external power system 25, and the surplus power (Wg-Wd) is supplied to the heater 22 to heat the heating medium in the heat storage tank 20 (step S12-16).

Thus, providing the power storage device 21 in addition to the heater 22 allows the surplus power to be stored. In particular, even when the temperature of the heating medium in the heat storage tank 20 is a predetermined temperature or more, and the temperature of the heating medium cannot be raised by the heater 22, energy can be effectively stored as electric energy. When the fluctuation of the power generation amount due to the renewable energy (the difference between the peak time and the normal time) is large, if devices to make effective use of surplus power are not made, an accumulator tank 8 of enormous size or a large number of accumulator tanks 8 are necessary. Since the cost of the accumulator tank 8 in the total cost is large, even when a new power storage device 21 is installed, the cost can be greatly reduced as a whole by reducing the capacity of the accumulator tank 8.

(Second Control Method)

FIG. 13 is a flowchart showing the second control method of the CAES power generation device 2 according to the fifth embodiment. Since the second control method of the present embodiment is approximately the same as the first control method shown in FIG. 12, only different points are shown.

Unlike the first control method, power more than necessary is supplied to the power storage device 21 (step S13-4). In addition, in step S13-10, the input power E is supplied to the power storage device 21. Since the power storage device 21 stores energy as electric energy, it has wider application than the case where energy is stored as heat energy by using the heater 22 as in the first control method. In addition, the power storage device 21 is determined whether to be fully charged (step S13-15), and when the power storage device 21 is not fully charged, the surplus power is preferentially supplied to the power storage device 21 over the heater 22 to be stored (step S13-16). When the power storage device 21 is fully charged, since the power cannot be stored any further, the surplus power is supplied to the heater 22 to heat the heating medium in the heat storage tank 20 (step S13-17).

Providing the heater 22 in addition to the power storage device 21 allows the surplus power to be used for heat storage. In particular, even when the power storage device 21 is fully charged and the power cannot be stored any further, energy can be effectively stored as heat energy.

As in the first control method and the second control method, the input power and the surplus power are supplied to the power storage device 21 and the heater 22 when necessary, and are stored as electric energy and heat energy. However, in addition to the description in the first to fifth embodiments, the input power and the surplus power may be stored in other embodiments.

In each of the embodiments described herein, the object of power generation with renewable energy can target all those using energy steadily (or repetitively) supplemented with the power of nature such as wind power, sunlight, solar heat, wave force or tidal power, running water or tide, and geothermy.

The invention claimed is:

1. A compressed air energy storage power generation device comprising:
   an electric motor driven with input power generated by using renewable energy;
   a compressor mechanically connected to the electric motor and configured to compress air;
   an accumulator tank fluidly connected to the compressor and configured to store compressed air compressed by the compressor;
   a pressure sensor configured to detect internal pressure of the accumulator tank;

an expander fluidly connected to the accumulator tank, the expander driven with the compressed air;

a power generator mechanically connected to the expander and configured to generate power;

a first heat exchanger fluidly connected to the compressor and configured to exchange heat between the compressed air supplied from the compressor and a heating medium;

a heat storage tank fluidly connected to the first heat exchanger and configured to store the heating medium heat-exchanged by the first heat exchanger;

a second heat exchanger fluidly connected to the accumulator tank and the heat storage tank, the second heat exchanger configured to exchange heat between the compressed air supplied from the accumulator tank and the heating medium supplied from the heat storage tank;

a heating unit configured to heat the heating medium in the heat storage tank by using power generated by the power generator;

a first power distributor configured to distribute generated power of the power generator to at least a power system and the heating unit; and a controller configured to control the first power distributor to supply a part or all of the generated power of the power generator to the heating unit when the internal pressure of the accumulator tank reaches a predetermined value and the generated power of the power generator is larger than a power demand in the power system.

2. The compressed air energy storage power generation device according to claim 1, further comprising a second power distributor configured to distribute the input power to the electric motor and the heating unit, wherein when operation efficiency of the compressor is not more than a predetermined value, the controller controls the second power distributor to supply the input power to the heating unit.

3. The compressed air energy storage power generation device according to claim 1, further comprising:

a power storage device electrically connected to the power generator, the power storage device configured to store the generated power of the power generator; and a temperature sensor configured to detect a temperature of a heating medium in the heat storage tank, wherein the first power distributor distributes power of the power generator to the power system, the heating unit, and the power storage device, and wherein the controller controls the first power distributor to supply a part or all of the power generated by the power generator to the power storage device when the internal pressure of the accumulator tank reaches a predetermined pressure, the power generated by the power generator is larger than the power demand in the power system, and the temperature of the heating medium in the heat storage tank measured by the temperature sensor is not less than a predetermined temperature.

4. The compressed air energy storage power generation device according to claim 3, wherein when input power supplied to the electric motor is not more than a predetermined value, the controller supplies power from the power storage device to the electric motor.

5. The compressed air energy storage power generation device according to claim 1, wherein the heating medium includes a first heating medium and a second heating medium separated from each other, wherein the heat storage tank includes a first heat storage tank configured to store the first heating medium and a second heat storage tank configured to store the second heating medium, wherein the first heat storage tank is fluidly connected to the first heat exchanger and the second heat exchanger, and wherein the second heating medium stored in the second heating storage tank is heated by the heating unit, and further comprising a third heat exchanger fluidly connected to the accumulator tank and the second heat storage tank, the third heat exchanger configured to exchange heat between the compressed air supplied from the accumulator tank and the second heating medium supplied from the second heat storage tank.

6. The compressed air energy storage power generation device according to claim 5, further comprising:

a first temperature sensor configured to detect a temperature of the first heat storage tank;

a second temperature sensor configured to detect a temperature of the second heat storage tank; and a heat exchange sequence switcher configured to switch which of the second heat exchanger and the third heat exchanger acts first on the compressed air supplied from the accumulator tank, wherein the controller controls the heat exchange sequence switcher to cause the second heat exchanger to act first when a detected temperature of the second temperature sensor is higher than a detected temperature of the first temperature sensor, and to cause the first heat exchanger to act first when a detected temperature of the first temperature sensor is higher than a detected temperature of the second temperature sensor.

7. The compressed air energy storage power generation device according to claim 1, wherein the accumulator tank has a capacity smaller than a capacity needed for a peak of the power demand.

8. The compressed air energy storage power generation device according to claim 2, further comprising:

a power storage device electrically connected to the power generator, the power storage device configured to store the generated power of the power generator; and a temperature sensor configured to detect a temperature of a heating medium in the heat storage tank, wherein the first power distributor distributes power of the power generator to the power system, the heating unit, and the power storage device, and wherein the controller controls the first power distributor to supply a part or all of the power generated by the power generator to the power storage device when the internal pressure of the accumulator tank reaches a predetermined pressure, the power generated by the power generator is larger than the power demand in the power system, and the temperature of the heating medium in the heat storage tank measured by the temperature sensor is not less than a predetermined temperature.

9. The compressed air energy storage power generation device according to claim 8, wherein when input power supplied to the electric motor is not more than a predetermined value, the controller supplies power from the power storage device to the electric motor.

10. A compressed air energy storage power generation device comprising:

an electric motor driven with input power generated by using renewable energy;
a compressor mechanically connected to the electric motor and configured to compress air;
an accumulator tank fluidly connected to the compressor and configured to store compressed air compressed by the compressor;
a pressure sensor configured to detect internal pressure of the accumulator tank;
an expander fluidly connected to the accumulator tank and driven with the compressed air;
a power generator mechanically connected to the expander and configured to generate power;
a first heat exchanger fluidly connected to the compressor and configured to exchange heat between the compressed air supplied from the compressor and a heating medium;
a heat storage tank fluidly connected to the first heat exchanger and configured to store the heating medium heat-exchanged by the first heat exchanger;
a second heat exchanger fluidly connected to the accumulator tank and the heat storage tank, the second heat exchanger configured to exchange heat between the compressed air supplied from the accumulator tank and the heating medium supplied from the heat storage tank;
a power storage device electrically connected to the power generator and configured to store the generated power of the power generator;
a first power distributor configured to distribute the generated power of the power generator to at least a power system and the power storage device; and
a controller configured to control the first power distributor to supply a part or all of the generated power of the power generator to the power storage device when the internal pressure of the accumulator tank reaches a predetermined pressure and the generated power of the power generator is larger than a power demand in the power system.

11. The compressed air energy storage power generation device according to claim 10, further comprising a second power distributor configured to distribute the input power to the electric motor and the power storage device, wherein when operation efficiency of the compressor is not more than a predetermined value, the controller controls the second power distributor to supply the input power to the power storage device.

12. The compressed air energy storage power generation device according to claim 10, further comprising a heating unit configured to heat the heating medium in the heat storage tank by using power generated by the power generator,
wherein the first power distributor distributes power of the power generator to the power system, the power storage device, and the heating unit, and
wherein the controller controls the first power distributor to supply a part or all of the power generated by the power generator to the heating unit when the internal pressure of the accumulator tank reaches a predetermined pressure, the power generated by the power generator is larger than the power demand in the power system, and the power storage device is already fully charged.

13. A method for compressed air energy storage power generation comprising:
compressing air with input power generated by using renewable energy;
storing compressed air;
generating power by expanding stored compressed air;
recovering compression heat generated in the step of compressing;
storing recovered compression heat;
heating compressed air to be expanded with stored compression heat before the step of expanding; and
further raising a temperature of the heat storage with a part or all of the generated power when a pressure of the stored compressed air reaches a predetermined value, and the generated power is larger than a power demand.

* * * * *